Figure 8:
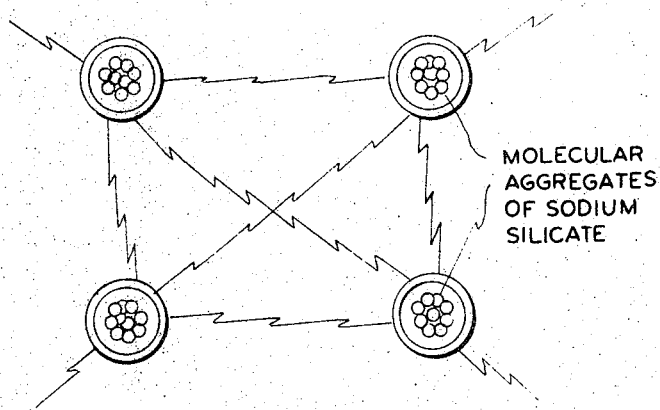

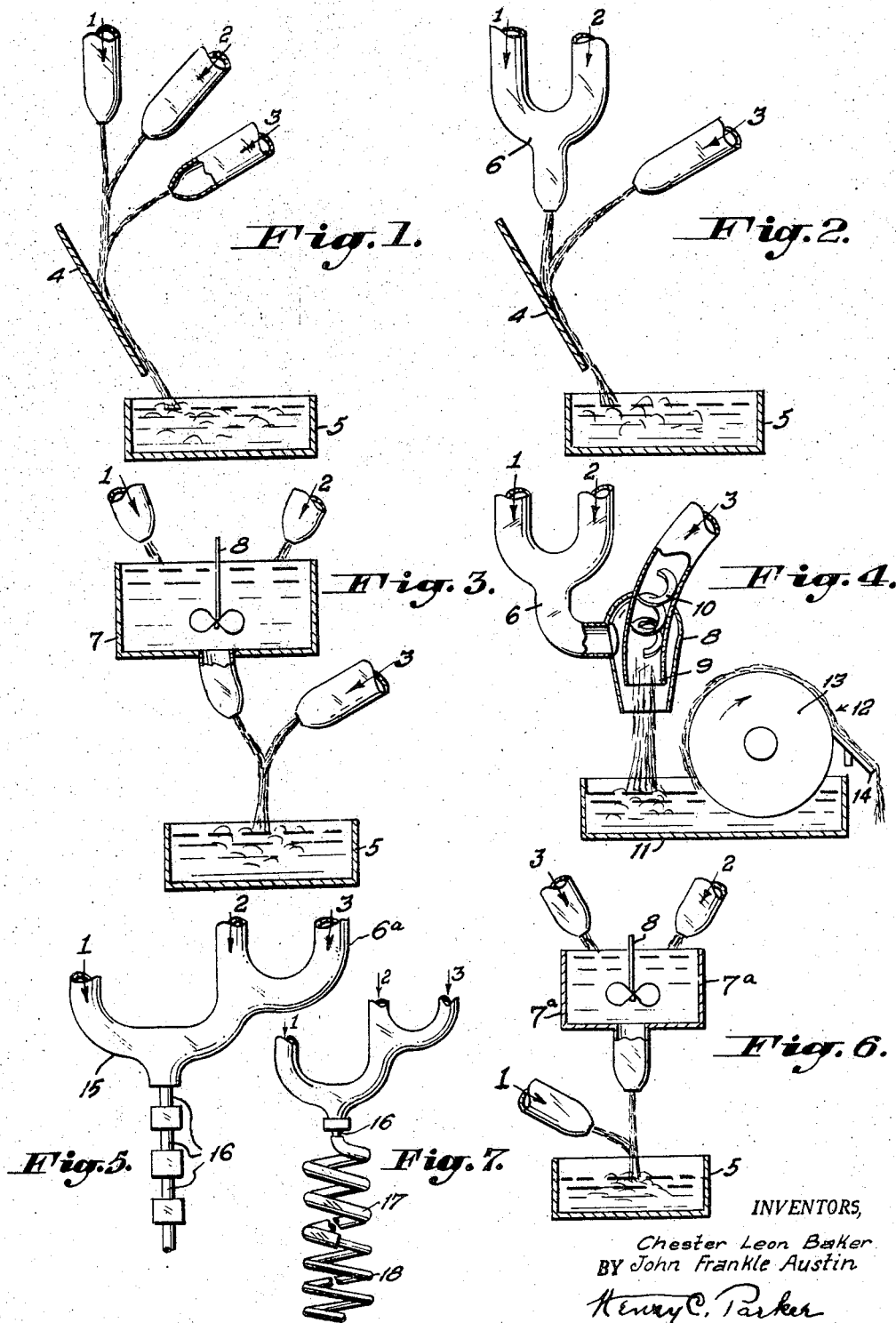

United States Patent Office 3,208,823
Patented Sept. 28, 1965

3,208,823
FINELY DIVIDED SILICA PRODUCT AND ITS METHOD OF PREPARATION
Chester L. Baker, Narberth, and John Frankle Austin, Philadelphia, Pa., assignors to Philadelphia Quartz Company, Philadelphia, Pa., a corporation of Pennsylvania
Filed Oct. 20, 1958, Ser. No. 768,823
9 Claims. (Cl. 23—182)

INTRODUCTION

This application is a continuation-in-part of our copending application S.N. 292,936 filed June 11, 1952 and our application S.N. 763,444, filed July 24, 1947, both now abandoned. In these prior applications we describe methods of obtaining finely divided solids by treating various inorganic colloidal solutions, such as solutions of sodium silicate, with coacervating agents and insolubilizing agents. In the present application we define more specifically and in greater detail the critical conditions required to produce a finely divided silica having the properties set forth below. It is believed and intended that all of the disclosures of the above applications are either specifically included or incorporated by reference in the present application.

This invention generally relates to a novel method for the manufacture of hydrated precipitated finely divided silica particles which are substantially free from silica gel. More particularly, the present invention relates to a method which involves the mixing together of an aqueous sodium silicate solution, a clustering agent, and an insolubilizing agent under certain prescribed conditions so as to produce extremely finely divided silica. In addition, this invention encompasses novel silica products having unusual properties, characteristics and uses.

BACKGROUND AS TO PRIOR ART SILICAS

As is well known, there are numerous industrial applications for silica, such as fillers and pigments in paints, rubber and greases. For many of these industrial applications it is highly desirable that the silica be in a very finely divided condition (e.g., below 1 micron in size and preferably below 0.1 micron).

Grinding is probably the most widely used and most satisfactory method for obtaining finely divided silica, but the grinding of silica to any high degree of fineness requires the expenditure of such a large amount of power that it renders the method impractical and particularly so when a fineness of less than about 1 micron is desired. In attempting to grind silica to a size below about 0.1 micron it has usually been found that the physical character of the grinding surface itself acts to effectively prevent the attaining of such a fine subdivision.

Various other methods have been suggested for the production of fine silica, such as chemical reactions in the vapor phase, chemical precipitation methods, subliming methods, condensations from the vapor phase, methods involving gelation, etc. Most of these methods are expensive, however, and others have drawbacks which render them commercially unattactive. Nevertheless, in spite of these unfavorable features, several of these auxiliary methods have been used commercially owing to the great demand for pigments, fillers, reinforcing, insulating, delustering agents and the like.

According to one of these chemical precipitating methods it has been proposed to produce finely divided silica by slowly adding a mineral acid or other precipitating agent to a sodium silicate solution containing a chemical agent such as sodium chloride (e.g. Kanhofer 2,438,560). In this method, it has been considered necessary to add the precipitating agent slowly to the sodium silicate solution in order to avoid the formation of a gelatinous precipitate, the thought apparently being that if the precipitate should be formed gradually it would be non-gelatinous. The precipitating agent was therefore added in a fine stream with continuous stirring during a period ranging from 5 to 10 minutes or more. It is evident that the particles produced at the start of the slow addition of precipitating agent are formed under instantaneous conditions of pH, concentration of silicate and ratios of all the reacting chemicals which are far different from the environmental conditions obtaining at the conclusion of the addition. The ratio of precipitating agent to silicate, for example, varies from zero to a maximum value during the course of the mixing.

Also, some prior art workers have added various chemical compounds to silicate solutions in amounts sufficient to form a creamy suspension which is neutralized slowly to form relatively large particles (e.g. Moyer, 2,386,337 and Donau B.P. 653,993).

There are prior art references which advocate very rapid agitation during the addition of the various reagents, but in these cases at least the final reagent has been added to the vigorously agitated solution over a period of considerable time, such as several minutes or even several hours. It is evident that even with very rapid mixing and intermingling of the reagents under these conditions all of the precipitation cannot occur under exactly the same environmental conditions, i.e. the precipitate cannot be formed from a homogeneous solution.

OBJECTS

The primary object of this invention is to produce a silica pigment of very small size. Another object of this invention is to produce a finely divided silica product having unusual utility as a rubber filler and as a thickener for oils.

Other objects of this invention will be evident after reading the following description and claims, taken in conjunction with the drawings.

THE INVENTION BROADLY

This invention broadly relates to a novel method for the manufacture of very finely divided silica particles which are substantially free from silica gel and which have a number of unusual properties. The instant novel method broadly involves mixing together and retracting the following three substances:

(1) An aqueous solution of sodium silicate,
(2) A clustering (or coacervating) agent which is capable of imparting a faint opalescence to the sodium silicate solution, and
(3) An insolubilizing agent which is capable of precipitating substantially pure silica from the mixture, in such a manner that the pure silica separates under homogeneous conditions.

PROPOSED THEORY BEHIND THE INVENTION

The preparation of finely divided silica by the instant process cannot be explained in simple terms according to present theories of physical and colloidal chemistry. Among other things, an exact scientific dissertation upon the present process would necessitate a lengthly discussion of such complex subject matter as electron theory, protons, electron screening, sharing of anions, association or polymerization of ionic groups, field strength of molecules, coordination numbers, micelles, colloidal ions, crosslinking, strain of molecular bonds, kinetic theory, polarization, etc. The work of Langmuir, and Verwey and Overbeek has been discussed in detail in our prior applications.

Figure 9:
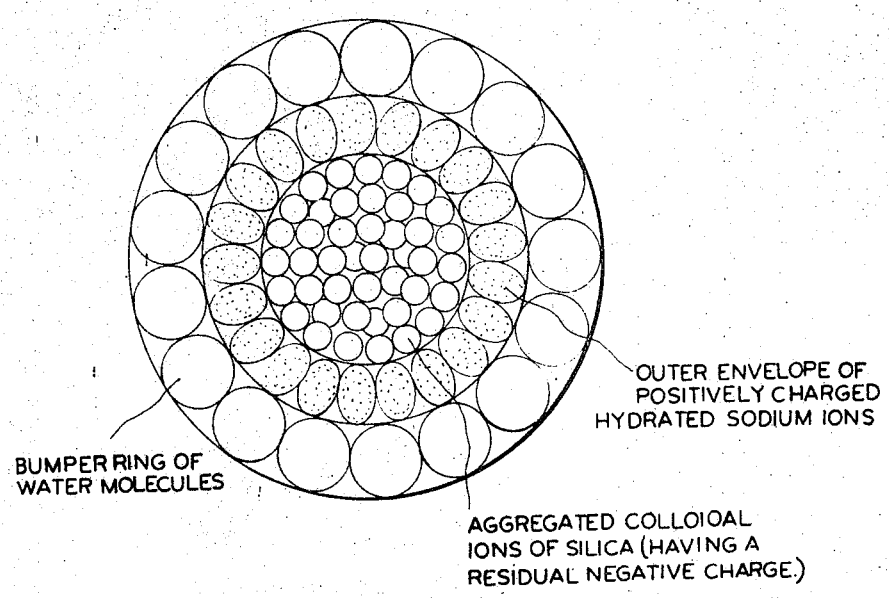

In brief, a sodium silicate solution contains ions of silica and micelles of aggregated silica (FIG. 8) with adsorbed ions of hydrated sodium. Because the sodium silicate is completely ionized, other ions of sodium sufficient to neutralize the charge are located in a layer close to the surface of the silica micelles (FIG. 9) and prevent further aggregation. When, however, acidic ions neutralize the alkali ions, the silica and the silicate ions are free to approach closer until the whole mass forms a gel.

If, before the neutralization agent, a clustering agent is added, it becomes possible to precipitate the limited amount of silica in the clusters without forming an extensive gel and with resulting preparation of a finely divided silica. These clustering agents are known as coacervating agents.

It was found, however, that the mere introduction of clustering agents into a sodium silicate solution was not the answer to providing finely divided silica products, even though it did avoid gel formation. Specifically, it was found that the introduction of the clustering agents caused the molecular aggregates of sodium silicate to cluster together so quickly that in an extremely short period of time the clusters of aggregates would grow so rapidly and so large that upon contacting with an acid or other insolubilizing agent the resulting silica product would nearly always be greater than 1000 millimicrons in size. On the other hand, if too small an amount of clustering agent was added, very little or no clustering took place and gelation occurred.

The present inventors ultimately discovered that one of the unexpected secrets of producing 7–100 millimicrons material was that the amount of the clustering agent had to be critically controlled. It was unexpectedly discovered that the correct proportion of clustering agent to silicate solution could be estimated very closely by a simple test in which the clustering agent is slowly added in measured quantities to a pre-determined quantity of silicate solution with sufficient time being given between each addition for the mixture to come substantially to equilibrium, the clustering agent being added until the first appearance of a faint opalescence in the mixture.

The change from non-opalescent to an opalescent sodium silicate solution appears to be one of those physical phenomena which occurs at a single point of concentration rather than over a range of concentrations. By stopping the addition of the clusternig agent just at this critical point of concentration we were able to obtain clusters of the desired size. In order to convert these clusters to silica, an insolubilizing agent must be added. If the insolubilizing agent is added slowly, as the prior art teaches, the gradual change in the concentration of the reactants and the reaction products will cause a large proportion of the clusters to either gel or grow rapidly in size, thus preventing the precipitation of silica particles of a uniformly small size. It is likewise true that so long as the insolubilizing agent is added to the silicate solution slowly, the above mentioned difficulties of gel formation and the formation of large particle size will occur even though the slowly added insolubilizing agent is thereafter rapidly intermingled with the silicate solution after it has been added. Unexpectedly, it was found that if complete insolubilization of all the clusters was caused to occur only during the very short time interval (generally less than one second) while the entire solution was instantaneously changed from the homogeneous, opalescent solution to the homogeneous final suspension, every cluster was insolubilized under the same environmental conditions and further growth of clusters did not occur and silica particles of a uniformly small size and other characteristics resulted.

THE SODIUM SILICATE SOLUTION

The aqueous sodium silicate solution may have a weight percent ratio of $Na_2O$ to $SiO_2$ within the range of from about 2:1 to 1:4 and the concentration of sodium silicate may be varied from about 0.5 to 30% $SiO_2$ when the process is being carried out merely to obtain a silica product having an average particle size below 100 millimicrons. However, when it is desired to produce a final silica product having an average particle size below about 20 millimicrons, it is desirable to employ aqueous sodium silicate solutions having a weight percent ratio of $Na_2O$ to $SiO_2$ of from about 1:1 to 1:4, generally from about 1:2.4 to 1:3.4. As a general rule, the higher concentrations of $SiO_2$ are employed with the lower ratios of $Na_2O$ to $SiO_2$.

Although a number of commercial sodium silicates are available which have the above described properties, those sodium silicates manufactured by the Philadelphia Quartz Company under the following trademarks have been found to be most satisfactory:

|  | $Na_2O$, percent by weight | Approximate analysis, percent by weight ||
| --- | --- | --- | --- |
|  |  | $SiO_2$ | $H_2O$ |
| "N" sodium silicate | 8.9 | 28.7 | 62.4 |
| "E" sodium silicate | 8.6 | 27.7 | 63.6 |
| "RU" sodium silicate | 13.8 | 33.1 | 53.0 |
| "S" sodium silicate | 6.4 | 24.0 | 69.5 |

THE CLUSTERING AGENT

Although the term "coacervating agent" is probably the most scientifically definitive term insofar as this invention is concerned, it has been found preferable to use the term "clustering agent" in its place since this latter term seems to more vividly describe the physico-chemical reaction which actually occurs. Accordingly, wherever these terms are used in the subsequent description and/or claims it will be understood that they are meant to be synonymous with each other.

Among the clustering agents which have been successfully used in our present novel process there may be mentioned:

(a) Completely water-miscible organic liquids, such as methyl alcohol, ethyl alcohol, acetone, ethylene glycol, monoethanol amine, ethyl ether of ethylene glycol, etc.;

(b) Ammonium hydroxide and its water soluble derivatives such as $NH_4Cl$, $(NH_4)_2SO_4$, $(NH_4)_2CO_3$;

(c) Highly soluble uni-univalent salts such as NaCl, KBr, $NaNO_3$; KCl; and (d) Highly soluble uni-divalent salts such as sodium sulfate and sodium carbonate.

Mixtures of coacervating agents are more difficult to control and to treat for the recovery of valuable materials, but in some cases there is an advantage such as, for example, the reuse of a filtrate containing both ammonia and sodium chloride or sodium carbonate.

The clustering agent must be a hydrophillic material which tends to reduce the effective charge on the colloidal particles in the sodium silicate solution and/or which reduces the effective dielectric constant of the medium between the particles. The clustering agent need not be an electrolyte since water-soluble or water-miscible hydrophillic organic materials in general are capable of functioning as clustering agents if added in sufficient quantity. The clustering agent should not form a precipitate with water and preferably not with a solution of the insolubilizing chemical. If the insolubilizing agent reacts with and forms a precipitate with the clustering agent this precipitate must be more soluble than $SiO_2$ so that the latter is formed preferentially when the three solutions are mixed.

THE INSOLUBILIZING AGENT

The insolubilizing agent used in our new process should preferably form no precipitate with either water or the clustering agent and must be sufficiently acid when reacted with a sodium silicate to produce an insoluble precipitate of silica, silicic acid or silica gel. It may consist of any of the mineral or organic acids, acid anhydrides or acid salts or mixtures thereof whose cations form soluble silicates; in fact any acid or acid material which is stronger than silicic acid can be used. Examples are $H_3PO_4$, HCl, $H_2SO_4$, $HNO_3$, $CO_2$, $SO_2$, $Cl_2$, $P_2O_5$, ammonium carbonate, ammonium chloride, ammonium nitrate, salts of organic cations such as basic dyes and quaternary ammonium compounds, $NaHCO_3$, $NaHSO_4$, $KHSO_4$, and organic acids such as acetic, oxalic, tartaric, citric, formic, fumaric, etc.

An advantage in the use of a carbonate ion as the insolubilizing agent is that less $CO_2$ equivalent is required than in the case of sulfuric acid and only a little more than the equivalent of HCl. In addition $CO_2$ is readily available from furnace stacks and can be absorbed by ammonia solutions in sufficient quantity for use. The ammonia and $CO_2$ can be recovered in stripping towers and reused so that a continuous process is possible in which all of the reagents are reused except the silica product. $Na_2CO_3$ and $NaHCO_3$ which are formed can be returned to the solution of clustering agent or they can be fused directly with quartz to make fresh soluble silicate solutions.

REACTANT AMOUNTS, REACTANT RATIOS AND REACTION RATES

It is evident that in our process two different reactions occur. The first is incipient clustering (or the development of opalescence) and the second is precipitation or insolubilization. These two reactions can be conducted separately or simultaneously. The two reactions occur at different rates since they are controlled by different phenomena. Our tests indicate that the precipitating or insolubilizing reaction usually occurs somewhat more slowly at ordinary temperatures than the clustering reaction, which may be due to the fact that the former requires a reaction at the particle surface changing the electrical attraction. Use is made of this fact when the precipitating chemical and the clustering agent are added substantially simultaneously to the silicate solution. If the insolubilizing reaction were the quicker a gel would be formed by this procedure.

The relative rates of reaction of the two steps vary with temperature. It is likely that above 50° C. the insolubilization reaction is the more rapid. Thus the temperature is a very important consideration when selecting the proper proportions of reagents. The difference in temperature effect is apparent from the fact that the solution temperature decreases on the addition of $NH_4OH$ and then returns to a temperature higher than the initial one on the addition of $H_2SO_4$, for example. Common salt (NaCl), likewise, causes cooling. A solution of $NH_4Cl$, on the other hand, will cause cooling when added to a water solution at 25°, but will cause heating when added to a solution at 30° C. The alcohols also tend to warm the solution on mixing. Insolubilizing agents, of course, tend to increase the temperature of the solution through the heat of neutralization. In addition, $H_2SO_4$ particularly causes the solution to warm by the heat of dilution. These temperature effects may explain the differences in results which are sometimes obtained upon change of insolubilizing or clustering agents.

The quantity of insolubilizing agent employed should usually be sufficient to substantially completely precipitate the silica present in the solution. Otherwise the process is uneconomical. A simple way of testing whether sufficient insolubilizing agent has been added is to filter off the precipitate and then to add more insolubilizing agent to the filtrate. If a secondary precipitate is formed in the filtrate this demonstrates that more should have been added previously. When non-alkaline clustering agents are employed it is sometimes sufficient to add an amount of insolubilizing agent which is chemically equivalent to the $Na_2O$ of the silicate. As a general rule, however, it requires from about 125 to 250% of this chemical equivalent to completely precipitate the silica. An excess over the exact requirement does no harm; it is merely uneconomical. A multiple precipitation may sometimes be useful. If insufficient insolubilizing agent is added to a properly balanced sodium silicate solution containing a clustering agent, the silica particles will usually be in the larger size range. If, after this precipitate of larger particle sizes is filtered off, additional insolubilizing agent is added, the filtered precipitate which results will usually be of smaller, more uniform size. In both cases, the insolubilizing agent should be mixed in within a period not substantially exceeding 5 seconds.

If the clustering agent is mixed with the silicate solution in an initial step in an amount sufficient or nearly sufficient to form a faint opalescence, a mixture is usually obtained which is stable isothermally. Such an activated solution may be termed a "protocoacervate."

In our process the correct proportions of clustering agent to sodium silicate solution can be estimated rather closely by first of all establishing a reference point by a simple test in which the clustering agent is slowly added in measured quantities to a predetermined quantity of the silicate solution with sufficient time being given between each addition for the mixture to come substantially to equilibrium, the clustering agent being added until the first appearance of a faint opalescence in the mixture. The so determined ratio of clustering agent to silicate solution may be called the equilibrium opalescence ratio and, for purposes of comparison, the amount of clustering agent required for equilibrium opalescence can be called 100%. This 100% ratio is the maximum proportion of clustering agent to silicate solution which can be used in our process when use is made of a mixing technique in which the clustering agent is first added to the silicate solution and this mixture permitted to come to equilibrium before addition of the insolubilizing agent. For the production of the very finest particles in accordance with our process the insolubilizing agent should be added before the appearance of any opalescence, i.e. before the appearance of clustered particles in the dark field of an ultramicroscope. This can be accomplished either by (1) using a quantity of clustering agent which is less than the 100% ratio or (2) by using a quantity of clustering agent equal to or greater than this 100% ratio but mixing in the insolubilizing agent before any opalescence has developed. When the latter expedient is employed best results are obtained with the use of a slow-acting clustering agent, such as brine or ammonia. With these slow-acting clustering agents it is possible to add a quantity substantially greater than the 100% ratio provided that the insolubilizing agent is added promptly after the addition of the clustering agent or simultaneously therewith.

In one series of tests, using method (1) above, enough ammonia was added (as the clustering agent) to a sodium silicate solution (having a ratio of $Na_2O$ to $SiO_2$ of 1:2.4) to produce the first appearance of a faint opalescence. This mixture was allowed to stand for a period of 30 minutes before the addition of an insolubilizing agent. It was found that the quantity of ammonia could be reduced to 80% of the equilibrium opalescence ratio and an excellent product was obtained at this ratio. In other tests, using method (2) above and employing a mixture of ammonium hydroxide and carbon dioxide as a combination clustering-insolubilizing mixture, it was possible to increase the proportion of ammonia to 485% of the equilibrium opalescence ratio. In other words, under certain conditions, it is possible to employ from about 80 to 500 percent of the quantity of ammonia which is required, when slowly added to a silicate solution, to produce the first appearance of a faint opalescence in the mixture. The corresponding range for NaCl is from about 30 to 180 percent. When three solutions are used in the mixing procedure and the clustering agent is all added to the silicate solution before the insolubilizing agent is mixed in, the operative opalescence ratios range from about 30% to 150%. Where the clustering and insolubilizing agents are used in admixture the operative range of opalescence ratios is from about 20 to 500 percent. The exact ratio which should be used in order to produce a product of optimum properties for any given purpose will depend upon the silicate ratio, the $SiO_2$ concentration of the silicate solution, the rapidity and type of mixing employed and upon what insolubilizing agent is used. Some preliminary testing is usually desirable in order to obtain best results.

We have found that in carrying out our process, the insolubilizing agent is always added to the solution of soluble silicate either with or after the clustering agent and that the clustering agent is always present in an amount sufficiently low that there results a translucent solution which becomes opaque within a finite time interval less than 5 seconds if a product is to be obtained having an average particle size below 100 mu. On the other hand, we have found that the development of gel particles can be avoided by maintaining sufficient clustering agent in this translucent solution.

CRITICALITY IN MIXING THE REACTANTS

In order to form finely divided silica under homogeneous conditions, according to the teachings of this invention, the mixing and reacting of the three reactants should take place under the following conditions:

(a) The environmental conditions should be maintained substantially uniform in the mixture while the $SiO_2$ particles are in the process of formation by mixing the clustering agent with the sodium silicate not later than the insolubilizing agent is mixed therewith; and (b) The mixing-in of the insolubilizing agent should be completed within a period not substantially exceeding 5 seconds and before the appearance of any substantial amount of an irreversible precipitate in the solution.

As noted earlier, the aforementioned reactants can be mixed in several different ways. Thus the three reactants can be mixed together simultaneously, or the silicate solution can be mixed first with the clustering agent first to form a faintly opalescent solution, before the addition of the insolubilizing agent, or the clustering agent can be mixed with the insolubilizing agent before mixing with the silicate solution. It is essential, however, to prevent the insolubilizing agent from becoming mixed with the silicate solution substantially before the latter has been mixed with the clustering agent. Also, as mentioned previously, it is essential in the step wherein the insolubilizing agent is reacted with the silicate solution that thorough mixing be substantially completed before the formation of substantially any irreversible precipitate, i.e. that the mixing be substantially instantaneous.

Several continuous mixing procedures are available wherein the ratios of insolubilizing agent to silicate solution are inherently maintained constant during the mixing. Some of these procedures are illustrated diagrammatically in the accompanying drawings. In this showing:

FIG. 1 is a diagramatic showing of how the three components of our mix can be contacted and mixed in the form of three jets, FIG. 2 is a similar showing of how a silicate solution and a clustering agent can be mixed by means of a Y tube and the resulting mixture contacted with an insolubilizing agent in a two-jet system, FIG. 3 is a similar showing of how a silicate solution and a clustering agent can be mixed and agitated in a vessel and the resulting mixture contacted with an insolubilizing chemical in a two-jet system, FIG. 4 is a similar showing of an improved method of mixing a silicate solution and a clustering agent in a Y tube followed by mixing the resulting mixture with an insolubilizing chemical in an ejector, a continuous filter being employed for recovery of the silica product, FIG. 5 is a similar showing of how a silicate solution can be mixed continuously in a Y tube with a pre-mixed mixture of clustering agent and insolubilizing chemical, followed by continuous agitation and mixing caused by passing the mixture through a series of constrictions, FIG. 6 is a similar showing of how the silicate solution can be jet mixed with a jet of a pre-formed mixture of clustering agent and insolubilizing agent, while FIG. 7 shows the use of a constriction and tubular connections to produce thorough mixing and agitation of the final mixture while in transit.

In the various figures of the drawing the reference numeral 1 denotes the silicate solution, 2 the clustering agent and 3 the insolubilizing agent. In FIG. 1 three jets are employed but the jet of silicate solution and the jet of clustering agent meet and unite before the jet of insolubilizing chemical contacts the mixture. The final mixture still in the form of a jet strikes the baffle 4 before falling into the container 5. In FIG. 2 the silicate solution and clustering agent are mixed in the Y tube 6, the resulting mixture in the form of a jet being mixed with a jet of insolubilizing chemical before the mixed jet strikes the baffle. In FIG. 3 the silicate solution and clustering agent are mixed in a vessel 7 provided with an agitator 8. The mixture leaves the mixing vessel in the form of a jet and this jet unites with a jet of insolubilizing chemical before the resulting mixture reaches the container 5.

In FIG. 4 a continuous process is illustrated wherein a silicate solution and clustering agent are mixed in the Y tube 6 the discharge from which passes tangentially into the upper chamber of ejector 8. The insolubilizing chemical is fed into the nozzle 9 of the ejector passing around the spiral baffle 10 and thereby acquiring a circulatory motion before passing through the nozzle. Owing to the circulatory motions thus produced a very thorough and substantially instantaneous mixing is produced before the resulting mixture passes into the pan 11 of the continuous filter shown generally at 12. The rotary filter drum 13 filters off residual liquor from the silica particles and the latter are scraped off by the knife 14. The particles can be washed while on the drum if desired.

In FIG. 5 the clustering agent and insolubilizing chemical are first mixed in the Y tube 6a and this mixture is mixed with the silicate solution in a second Y tube 15, after which the resulting mixture passes through a series of constrictions 16 to produce thorough mixing.

In FIG. 6 a jet of silicate solution is mixed with a jet of a pre-formed mixture of clustering agent and insolubilizing agent formed in 7a, the resulting mixture falling into container 5.

In FIG. 7 the three solutions are mixed in Y tubes and the final mixture is then passed first through a constriction 16, then through a flexible tubing 17 of large size and finally through a tubing 18 of medium size. In other cases, a length of narrow tubing is attached directly to the Y and at the point of opalescence, a short, wider nozzle is attached. These arrangements produce thorough or intense mixing. The discharges from the mixing devices of FIGS. 5 and 7 can be passed directly to a continuous filter to recover the silica product, if desired.

It is believed to be evident from the various figures illustrated on the drawing that in each type of mixing shown the relative proportions of the components are maintained substantially constant in the mixture throughout the procedure. As indicated previously this type of mixing is highly advantageous in the step wherein the insolubilizing chemical is mixed with the silicate solution and is also advantageous but of less importance in the step wherein the silicate solution is mixed with the clustering agent.

In order to obtain equilibrium in the short time available, particularly at high concentrations of $SiO_2$ or high opalescence ratios, it is important to develop a very rapid mixing or in other words, a very high intensity of mixing. Various expedients such as the use of jets or Y mixing devices develop very rapid or intense mixing if sufficient pressure is provided. The sufficiency of a given pressure will depend on the viscosities, velocities, and the angles of intersection and other properties of the stream which, for tube flow, may be measured by the Reynolds number. In devices employing tubes, turbulent flow with a Reynolds number of at least 10,000 is required. In other types of mixing, high speed pumps used below the limit of their capacity may provide sufficient intensity. In our experiments we have developed Reynolds numbers of 100,000 or more and have used jets at pressures over 40 p.s.i. and narrow tubes at presures of 200 p.s.i. and stirrers rotating at 7,000 r.p.m. or more. We see no obstacle to the use of higher pressures or greater intensities except the physical properties of the equipment used. Our tests indicate that the more intense and complete the mixing, the finer the particles produced and the more uniform the particle size of the product. We therefore use a mixing method in which mixing is substantially instantaneous.

Of course it is possible to employ other mixing techniques than those which have been described above. Thus turbomixers can be employed or methods employing the use of thin films, etc. But in all of these procedures complete mixing, at least complete mixing in the step wherein the insolubilizing agent is mixed with the silicate, should be completed within a period of less than about 5 seconds.

Best results are obtained when use is made of a concurrent flow mixing technique, described more specifically hereinafter, wherein the proportions of insolubilizing agent to silicate are maintained substantially constant during the mixing. When this type of mixing is employed, substantially instantaneous mixing can be accomplished inherently. The requirement that all of the silica particles be formed in the same environment obviously precludes pouring the insolubilizing solution slowly into a beaker containing a mixture of sodium silicate solution and clustering agent or vice versa, as described in the prior art. We have discovered that these conventional mixing procedures invariably produce products containing substantial proportions of silica gel. Moreover, the products produced by these prior art procedures contain silica particles of widely varying size whose average size is substantially greater than that of the products produced by our improved process. In our tests with our new mixing technique we have been able to produce some products having an average particle size of as low as 7 mu or less. By holding concentrations and operating conditions within preferred critical limits we have been able consistently to obtain products having average particle sizes below 20 mu and substantially free from silica gel.

The ratio of clustering agent to silicate solution employed in the process and the speed with which the clustering agent acts will determine how soon the insolubilizing chemical must be mixed in. If the opalescence ratio is low, for example, if it approaches 30 percent, it is possible and sometimes advantageous to mix the silicate with the clustering agent and then to let this mixture stand for from a few minutes to several hours before mixing in the insolubilizing agent. This is particularly true when slow-acting clustering agents are employed. Some insolubilizing agents, especially slow-acting insolubilizing agents, tend to enhance the effect of the clustering agents. In fact we have discovered that certain chemical compounds and chemical mixtures can be employed to produce both effects. This requires the use of a slow-acting insolubilizing agent, such as $CO_2$, $SO_2$ or $Cl_2$, in admixture with a clustering agent which is at least moderately slow in action, such as $NH_3$, or NaCl. We have obtained our best results using $CO_2$ or $CO_2$ dissolved in ammonium hydroxide. It therefore appears that a slow-reacting insolubilizing agent gives better results than a quick reacting agent. This may be due to the fact that it is possible to obtain complete mixing in the case of the slow-reacting agents before their action becomes effective. If the opalescence ratio is exceeded it is usually necessary to mix in the insolubilizing agent simultaneously with the clustering agent and before the appearance of opalescence.

As indicated above it may be a matter of choice whether the clustering agent is mixed with the silicate solution before or simultaneously with the insolubilizing agent, this depending upon the opalescence ratio and the conditions employed. When the clustering agent is mixed in a beaker with the silicate, for example, local high concentrations may produce clustering. But this temporary clustering disappears upon further mixing. The manner in which the clustering agent is mixed with the silicate solution appears to be of less importance than the manner in which the insolubilizing agent is incorporated in the mix. The principal requirement seems to be that the mixing of clustering agent and silicate solution should be completed before the appearance of any trace of permanent precipitate in the mixture. This is essential to produce fine silica particles of relatively uniform size. Rapid and complete mixing produces best results and it is advantageous but not necessarily essential to keep the ratio of clustering agent to silicate solution substantially constant as mixing proceeds. One of the simplest ways of holding this ratio constant is to pour the clustering agent and the silicate solution simultaneously into a beaker, the pouring rates being controlled so that the relative proportions remain substantially constant throughout the mixing. On a larger scale the two solutions can be piped into a mixing tank with the flow in each pipe controlled to produce the correct ratio.

In the case of the mixing step wherein the insolubilizing agent is brought into reaction with the silicate solution containing a clustering agent at the point of opalescence it is essential that mixing be completed substantially instantaneously before the appearance of any substantial amount of irreversible precipitate in order that the environmental conditions be maintained substantially uniform while the particles are being formed. In the case of slow-acting insolubilizing agents or low opalescence ratios this can be accomplished with fair success by pouring the insolubilizing agent quickly into an agitated beaker containing a mixture of clustering agent and silicate solution or by pouring all three into the beaker simultaneously. Pouring (i.e., mixing) should not take over about 5 seconds and, as indicated, it should be completed before the appearance of any substantial amount of irreversible precipitation. Agitation of the batch should be continued until it thickens. When the insolubilizing agent is mixed with the silicate solution by pouring them simultaneously into a beaker it is evident that the ratio of these two reagents is maintained substantially constant during the mixing. Inherently the environmental conditions are maintained substantially uniform during the formation of the silica particles. It is also possible to accomplish this result by first mixing the clustering agent with the insolubilizing agent and pouring this mixture into a beaker simultaneously with the silicate solution. Better results are usually obtained under these conditions. On a larger scale the solutions or mixtures can be piped rapidly and simultaneously into an agitated tank. They also may be run in at opposite sides of the tank filled with a diluting agent which may contain clustering agent and brought into reaction in a central area where the conditions of precipitation are maintained constant. These mixing methods, are, of course, batch processes.

A further very surprising discovery in accordance with this invention is that the mixing conditions which prevail after the silica is precipitated are very important insofar as producing silicas which will result in a high modulus when compounded with rubber. We have found that if vigorous mixing is continued after the point of precipitation of the silica (that is, when the solution thickens or sets up) the resultant silica will create high tensile strength but not the highest modulus. Although the silicas produced by our invention in general have a relatively high modulus, we have found that mixing should be stopped completely for at least 30 seconds and preferably longer immediately after the solution sets up in order to develop the very highest modulus properties. However, a gentle agitation may be permissible.

TREATING THE FRESHLY PRECIPITATED SILICA

There is a distinct difference between the products of tray drying and spray drying. In tray drying, the product necessarily remains at about the boiling point of water for periods ranging from below about one minute to several hours even though the temperature of the surrounding air may be well above 110° C. and the layer or lump thickness may be as low as a sixteenth of an inch. Our product dried under such conditions tends to have a lower surface area and increased aggregation. On the other hand, spray dried product, that is product which is propelled as small particles which may remain in an atmosphere no warmer than 105° C. for substantially less than one minute has higher surface areas and is less aggregated.

The washing will also help to control the effect of the drying temperatures. If the $Na_2O$ is reduced below about 1% there is little difficulty with increased aggregation and reduction in surface area by fast drying. When silica is washed with distilled water it is easy to prepare a product having 99.5% $SiO_2$ on the anhydrous basis. However, when washed with raw water the silica has a strong attraction for cations and the HF residue rises rapidly. This may mean that the silica content of the final anhydrous product will be as low as about 95%. If an acid wash is included before drying so that the pH is reduced below neutral, the surface area will be very much greater. However, the product may be acidified and then brought back to an alkaline condition before drying if a low surface area is required.

USE OF OUR NOVEL SILICA IN RUBBER

This invention is directed to a new hydrated precipitated silica formed by a new process. This product is different from any silica precipitate known heretofore as shown by its characteristics. It is particularly suited to reinforcing natural rubber. It is well-known that the GR-S type of synthetic rubber is rather easily reinforced and in fact, is very weak unless some reinforcing agent is present. Only an exceptional filler will give good properties to natural rubber products. Natural rubber in itself has a high tensile strength but a rather low modulus and in reinforcing rubber a high modulus is especially desirable since it tends to produce higher abrasion resistance in a vulcanized rubber composition. Our silica, in a preferred form, is the first precipitated silica which will impart really high modulus vaules to a compounded rubber while maintaining satisfactory tensile values.

For example, in comparing natural vs. synthetic rubber we note that natural rubber possesses a high tensile strength but requires reinforcement to improve its abrasion resistance as a function of increased modulus and tear resistance. Synthetic rubber on the other hand require a high degree of reinforcement to improve its tensile strength as well as its other properties. Typical properties of vulcanized, non-reinforced natural and synthetic rubber are as follows:

|  | Natural | GR-S |
|---|---|---|
| 300% modulus, p.s.i. | 275 | 200 |
| Tensil strength, p.s.i. | 4,000 | 1,300 |
| Tear resistance, p.i. | 275 | 75 |
| Elongation, percent | 750 |  |
| Shore hardness | 38 |  |
| Rebound, percent | 70 |  |

It should be noted that in later years the co-polymerization of this synthetic rubber at lower temperatures has permitted longer and stronger rubber chains with stronger cross-linkage with resulting improved tensile strength.

Rubber reinforced by the carbon blacks used in the rubber industry, when suitably compounded in our standard formulation (described under "test methods") will produce vulcanized rubbers having at least the following values:

| | P.s.i. |
|---|---|
| 300% modulus | 1400 |
| Tensile strength | 4000 |
| Tear resistance | 700 |

Prior art silicas have approached one or possibly two of these values but it is believed that this is the first instance when all three of these values have been obtained using silica as the reinforcing agent.

Very early in our testing program comparisons were made compounding natural rubber and GR-S rubbers. In general, when compared to carbon black, the improvement of our silicas was about the same for GR-S as for natural rubber. Therefore, most of our testing was done with the natural rubber as a standard. It is recognized that material which reinforced natural rubber will correspondingly improve GR-S rubber.

We define a high modulus silica as a product which, when incorporated in our standard formulation, permits a tensile strength of at least 3700 p.s.i. and a modulus above 1300 p.s.i. at 30% extension when vulcanized at our standard temperature using the optimum concentration of accelerator.

Our preferred high modulus material has approximately the following properties:

| | |
|---|---|
| Particle size | 10–20 mu. |
| pH | 6–10. |
| $SiO_2$ content, percent (anhydrous basis) | Greater than 95. |
| Free water, percent | 2–10. |
| Bound water—mols of silica/mol of $H_2O$ | 4–8. |
| Filler form | Porous aggregates. |
| Surface area, m.²/gr. | 90–250. |
| $Na_2O$ content, percent | 0.1–1.5. |
| Tensile strength in natural rubber, p.s.i. | Greater than 3700. |
| Tensile strength in GR-S rubber, p.s.i. | Greater than 2500. |
| 300% modulus in natural rubber, p.s.i. | Greater than 1300. |
| ASTM linseed oil adsorption, grs./gr. | Greater than 1.5. |
| 325 mesh wet sieve residue, percent | 0.00. |
| Grease thickening power, mm./10 | Less than 275. |
| HF residue | Less than 4%. |
| Ignited loss, percent | 5–15. |
| Refractive index | About 1.46. |

It is, of course, recognized that high modulus may be obtained in a compounded rubber composition by varying the additives and the processing conditions, but at the same time the tensile strength will be greatly reduced. We have for the first time developed a precipitated silica which will develop a high modulus above about 1300 p.s.i. at 300% elongation under conditions which develop the optimum tensile strength. For our high modulus silica, the optimum tensile strength loading is between 10 and 15 volumes per 100 volumes of rubber. The optimum loading is somewhat higher for a high tensile type silica having a particle size in the range of 10–30 mu.

Our silica also has higher linseed oil adsorption values than other precipitated silicas, using the standard ASTM procedure employed for control purposes in the carbon black industry. We believe that this is indicative of high structure and correspondingly high modulus.

Our procedures which involve the co-precipitation of latex and $SiO_2$ are of particular importance to the rubber industry since an extremely uniform mixture is produced without the use of any costly milling procedure. Furthermore, the mixture is produced at a time when the particles of both rubber and silica are in a peculiarly active state.

OTHER USES AND PROPERTIES OF OUR NOVEL SILICA

The pure silica products obtained in our invention are uniform in particle size and shape, usually amorphous, the bulk being spherical and characterized by their unexpected softness. After washing with distilled water and drying at 100° C. they have the following physical properties:

| | |
|---|---|
| Refractive index | 1.42 to 1.46. |
| Particle size | 7 to 100 mu. |
| Hardness | About 0.02 gms. zinc per gm. $SiO_2$/min. |
| Absorptivity: | |
| Linseed oil | 1.0–2.3 gms./gm. |
| Petroleum ether | 5.5 gms./gm. |
| Kerosene | 3.1 gms./gm. |
| Thermal conductivity | Approx. $1 \times 10^{-5}$ cal. per sec.-cm.-° C. |
| $SiO_2$ content (anhydrous) | At least 99.5%. |
| Gel content | Less than 0.1%. |
| Area | 25–400 m.$^2$/g. |

The products produced by the present invention pass a 325 mesh wet sieve to the extent of about 99.8 percent or better. Our best products lease less than 0.01 percent retained on the 325 mesh screen.

It is believed to be evident from the above description that the novel products produced by our method have many important industrial uses, such as fillers, pigments, delustering agents, diluents, dust insecticides, components of printing inks, polishing composition, fertilizers, paints, etc., reinforcing agents, filter aids, insulating compounds and the like. The silica products of our invention are believed to have all-around properties which are superior to those of any of the somewhat similar products which have previously appeared on the market.

Our products are especially satisfactory for thickening oil for high temperature lubrication.

We have also found that our new process is especially valuable in giving control of structural characteristics of the product, which makes it especially useful for providing a coating of very fine hydrated silica particles on fibers and other inert particles. Thus, a cotton fiber may be made resistant to slippage or dye pigments may be extended.

TESTING AND ANALYTICAL PROCEDURES USED IN EXAMPLES

In order to more clearly understand the examples which are to follow, the various testing and analytical procedures employed in these examples are indicated below.

We have found a rather simple way of testing silica products for the presence therein of silica gel. This is done by subjecting the products to a 325 mesh wet screen test, after grinding under standard conditions. Any residue left on the screen can be considered to be silica gel. This is the same test which has been approved as standard for carbon black and is known as ASTM Test D-185-45; see American Society for Testing Materials Standards of 1949 (part 4), page 163.

Thermal conductivity of the silica was determined by the method described in Industrial and Engineering Chemistry 31, 827 (1939). The water around the guard ring and calorimeter was kept at the same and a constant temperature through a controlling heater.

The value for the hardness mentioned in the above description was determined by rubbing 0.1 gram of the $SiO_2$ product between two zinc plates for one minute and determining the weight of the zinc removed from the plates by attrition per gram of $SiO_2$ employed.

The particle size was determined by the P. and G. method, described by Pechukas and Gage, Ind. Eng. Chem. Analytical Edition, 18, 370 (1946), using a pressure of 35 p.s.i. for plug formation and corrected by an empirical chart drawn from determinations by an electron microscope.

pH is determined by the Wiegand method (Ind. & Eng. Chem. vol. 29, p. 953, 1937) widely used in the carbon black industry. One part of the pigment is mixed thoroughly with 4–10 parts of water and the mixture is heated and boiled for at least one minute. It is then cooled to room temperature, settled, decanted and the sludge is tested with Hydrion paper. This correlates with the electro-metric meter determination.

Titratable $Na_2O$ is determined by taking one gram of silica with 50 ml. of water. The mixture is heated to boiling, cooled to room temperature and titrated with 0.2 N HCl to a Methyl Orange end point.

The surface area may be measured by the Brunauer-Emmett-Teller method described in J. Amer. Chem. Soc. 60, 309 (1938). Actually, most of our determinations were made by a variation of this method described by W. B. Innes in Analytical Chemistry 23 (5), 759 (1951).

The HF residue is determined by standard chemical analysis, i.e., the silica is determined gravimetrically and then volatilized with HF and the weight of the ignited residue is determined.

The refractive index was determined using the Backe test with standardized immersion liquids as described by Chamot and Mason in "Handbook for Chemical Microscopy," vol. 1, John Wiley and Sons, 1930.

The bulk density or apparent density was determined by the method indicated by Scholes on p. 7 of the "Handbook of Glass Industry," 1941, with the variation that the 100 ml. graduate was filled with the fine silica powder and then the bottom of the graduate was tamped lightly on a large rubber stopper until no further decrease in volume was evident. The tamping was then continued for 100 more strokes. The weight of the sample divided by the final volume gives the bulk density.

The filler form is found either with a very high power microscope or from electron-microscope photographs.

Free water is determined by drying at 105° C. for 20 hours in a laboratory oven. The thickness of the layer should not be more than one-half inch and some provision should be made for moving the air in the oven. It should be dried to a constant weight.

Bound water is determined by substracting the free water from the total ignited loss. Ignited loss is found by heating the pigment to above 800° C. to constant weight.

The grease penetration test is described in ASTM D-217-52T or D-217-48 (ASTM Standards, 1949, Part 5, p. 816).

The linseed oil adsorption is determined by the standard ASTM test D-281-31 (ASTM Standards, 1949, Part 4, p. 169) in which the pigment is rubbed out in linseed oil.

In the testing of our product with natural and synthetic rubbers, the standard ASTM Procedures which were in effect at the time, as for instance, D15-55T and D15-41, ASTM Standards, 1949, Part 6, p. 775, were followed in general.

Most of our test work was done with natural rubber, using the following standard formulation:

| Components | Recipe, grams | Final composition |
| --- | --- | --- |
| Natural rubber* | 191.4 | 100 parts. |
| 50% zinc oxide master batch | 22.0 | 5 parts ZnO. |
| 50% sulfur master batch | 13.2 | 2 parts sulfur. |
| 20% Santocure master batch | 8.25–53.5 | 0.75–4.5 parts Santocure. |
| 45% Stearex beads | 6.6 | 3 parts stearic acid. |
| Silica reinforcing filler | 94 | 42.6 parts (20 volume loading). |

*Usually the natural rubber was a 50% mixture of high-grade pale, crepe rubber and high-grade smoked sheet rubber. The amount of batch prepared depended on the mill to be used, the number of accelerator level variations to be determined and the number of cure times necessary. In general, it was approximately 400 grams of rubber.

A master batch is a premixed combination of natural rubber, e.g. 50% sulfur and 50% natural rubber.

Santocure is a rubber accelerator sold by the Monsanto Chemical Co. and is said to be a condensation product of mercaptobenzothiazole with cyclo hexyl amine.

Stearex beads are a hydrogenated fish oil sold by the Binney and Smith Co. and correspond to stearic acid. A fine grade of zinc oxide sold by the New Jersey Zinc Co. as XXR4 is preferred.

A fine grade of sulfur known as Impalpable sold by the Food Machinery Corp. was generally used.

The optimum accelerator loading was determined by making up one batch with the high proportion of the Santocure accelerator and a second batch with the low proportion of accelerator. These two base batches could then be blended to obtain intermediate levels of accelerator. In all cases, the batches were re-milled as usual in order to obtain the best possible dispersion.

Our mixing procedure was to mill the rubber in order to break it down and then add the zinc oxide and Santocure master batches. Following this, the filler and stearic acid master batches which had been pre-mixed were added and finally the sulfur master batch.

In general, we followed the following routine:

| | Time in minutes | Roll opening in inches |
| --- | --- | --- |
| Crack the rubber and mix in zinc oxide and Santocure master batches | 1 | 0.030 |
| Bend rubber on front roll | 3 | 0.075 |
| Cross cut 4 times | 1 | 0.110 |
| Open rolls to form small rolling band on both rolls | 1 | 0.110 |
| Add pre-mixed stearic acid and finely divided silica | 6–15 | 0.110 |
| Add sulfur master batch | 1 | 0.110 |
| Cross cut 6 times | 1 | 0.110 |
| Cross roll 6 times | 1 | 0.110 |
| Slab off | 3 | 0.100 |

The roll temperature was 150–160° F. at the start with an increasing variation to between 150–172° for the entire period using cooling water through the rolls to balance generated heat.

After resting overnight the batch was remilled. The compound was on the rolls at a temperature of 160° F. and then rolled with the rolls opened sufficiently to form a small rolling bank for two minutes with continuous cross cutting and then sheeted off at 0.090 with the rolls open to form a sheet of sufficient thickness to nearly fill the ASTM tensile mold cavity.

The milling loss of the batch was found to be less than 3% of the added pigment. This appears to be water either absorbed from the atmosphere or water of hydration contained in the pigment lost during the heating which occurs during milling. The mill is equipped with a suction fan to avoid scattering dusts.

The milled material was aged for 16 to 24 hours before vulcanizing and the vulcanized material was also aged for 16 to 24 hours before testing.

The standard mill used had two 6 by 12-inch rolls with roll speeds of 24 and 33.5 r.p.m. Re-milling was carried out on a smaller or "toy" mill having 3-inch by 6-inch rolls. This was found not to introduce any error in the procedure since the same results were obtained if re-milling was carried out on the standard mill.

For vulcanization, the batch was placed in a mold consisting of a steel plate with eight standard rectangular insets having sections 2.75 inches by 5.5 inches by 0.01 inch. The batch was cured at the temperature of the steam in the upper platen of an hydraulic press, 287° F., for the time required, using a hydraulic pressure of 1,100 p.s.i. by compression with a 16-inch diameter hydraulic ram. The samples were quenched by immersion in water at room temperature.

Dumbbell test specimens were die cut from the vulcanized slabs with a die similar to ASTM Die C, except that it was 0.75 inch at the wide part and 0.5 inch at the neck down section. These specimens give the same results as the ordinary die specimens, except that the liability of error is somewhat greater in modulus and tear.

For tensile and modulus determinations, five modified dumbbell specimens were pulled on a Scott tensile testing machine at a speed of 20 inches per minute. The load at varying elongations, i.e. the modulus, is noted manually until the specimen breaks. The various moduli, load at break and elongation of break are then calculated. This procedure follows ASTM Standards, 1949, Part 6, p. 887, Specification No. D412–49T.

Shore hardness is determined in duplicate on four plies of the ends of the tensile strips by means of the Shore Durometer actuated by a gross load of two pounds. The hardness is read after the needle has been in contact with the sample 10 seconds. (ASTM D676–49T, ASTM Standards, 1949, Part 6, p. 1039.)

Re-bound resilience is determined in duplicate on four plies of the enlarged ends of the tensile strips by means of a Lupke rebound resilience tester. (Compare ASTM D1054–49T, ASTM Standards, 1949, Part 6, p. 1205.)

The Winkleman tear test specimens are died out with ASTM die type A. Four stress-strain and four tear-resistant specimens are made at room temperature and humidity conditions using the Scott tensile tester with the jaw separating at the rate of 20 inches per minute. (Compare ASTM D624–48, ASTM Standards, 1949, Part 6, p. 1026.)

In the test for abrasion resistance in natural rubber the basic formulation was used. (Compare ASTM D394–47, ASTM Standards, 1949, Part 6, p. 874.) One part of an anti-oxidant (Thermoflex A) defined on p. 436 of the "Handbook of Material Trade Names," Industrial Research Services, N.H. 1946, was added in the cases indicated. The amount of Santocure accelerating agent was chosen to give an optimum cure corresponding to the channel black control, that is, 25 minutes at 287° F.

The batches were mixed on a standard 6" by 12" mill and the stress-strain resistance data were obtained from standard ASTM sheets. In the case of the coated material of Example 14, the batch was mixed on the "toy" mill and the stress-strain data were obtained from somewhat thicker and shorter stress-strain specimens. The abrasion resistance data is the average of two determinations each on the optimum cure and a cure 5 minutes above as well as one 5 minutes below the optimum cure. The hardness is reported as the average for the three cures of each of the abrasion discs tested. The abrasion discs were approximately 0.4 inch thick while the tensile strips were from 0.08 to 0.1 inch thick. The abrasion discs being thicker were cured for 10 minutes longer than the tensile strips. A laboratory abrasion wheel was used to determine the relative abrasion loss.

In tests with synthetic rubber, the GRS rubber or Philpreme 1000 is now known as SBR 1000, a hot, fatty-acid type, whereas GRSX485, the cold, rosin-acid type, later known as GRS 100, is now known as SBR 1500. In preparing the GRS mixes, the mill rolls were at 95–100° F. without cooling water. The rubber, zinc oxide and Santocure were broken down until smooth, maintaining a small rolling bank. Then the pigment was added and the roll opened to continue the bank. Following that, the sulfur master batch was added and the mix was cross cut and cross rolled 12 times to disperse the pigment thoroughly.

In Example 26, the mix was prepared on a Banbury mill size B, 1000 grams polymer capacity. Ordinarily, the pigment could be added in two increments, but that treated with glycerine was so fluffy that four increments were necessary. These light powders had a loss of about 1.5% of the batch weight.

The mixing procedure with Example 26 was as follows.

| Operation | Roll opening in inches | Time in minutes |
|---|---|---|
| Crack rubber | .035 | 1 |
| Two passes | .008 | 1.5 |
| Band | .075 | 0 |
| Add resin | .075 | 2 |
| Six cross cuts | .075 | 2 |
| Five passes | .005 | 3 |
| Break down rubber | .085 | 5 |
| Add pigment | .085–.110 | 11–33 |

5–8 HOUR TIME LAPSE

| | | |
|---|---|---|
| Add other ingredients | .110 | 3.5 |
| Twelve cross cuts | .110 | |
| Six cross rolls | .110 | 10 |
| Weight, take roll and batch temperature and sheet off | .060–.065 | |

NOTE.—Temperature range 100–145° F. Batch temperature about 175° F.

There was a break of five to eight hours between the mixing in the Banbury and the mill addition of the accelerator powders and other ingredients which was done on the standard mill after removal of the batch from the Banbury mixer.

THE EXAMPLES

While the above general description of the new process is believed to be sufficiently detailed to teach those skilled in the art how the new process can be applied in practice, the following specific examples will serve to explain the invention in greater detail. These examples represent practical operating embodiments of the new process. The percentages and parts are by weight unless otherwise indicated.

In the following examples, the terms (a) 28% $NH_3$ solution or (b) 28% ammonia solution are intended to mean a 28% $NH_3$ ammonium hydroxide solution. Concentrated HCl and $H_2SO_4$ refer to the standard commercial products having a content of 36% HCl and 93.2% $H_2SO_4$ respectively.

An ammonium carbonate solution varies in the proportion of $NH_3$ to $CO_2$. We therefore usually refer to "$NH_3$:$CO_2$ solutions" followed by a statement of the actual composition.

The terms "10%, 15%, 20%, 25% and 30% standard silicate solution" refer to aqueous solutions of "N" sodium silicate (e.g., a 10% standard silicate solution being comprised of 10% by weight of "N" sodium silicate and 90% by weight of water).

All of these diluted silicate solutions were aged at least one day to insure uniformity of micelle size. Un-aged diluted silicate solutions require different proportions of coacervating agent to give an optimum size.

The product is in all cases, substantially $SiO_2$, except where mixtures are stated to form. The silica is hydrated unless anhydrous material is specified.

Example 1

In this example carried out at room temperature, a mixing procedure similar to that shown in FIG. 2 was used in which the jet nozzles had a bore diameter of 0.051 centimeter. 100 ml. of a 25% standard silicate solution was conducted through tube 1 which was two inches long and was mixed in the Y with a clustering agent comprising a 28% ammonia solution also flowing through another two inch leg, 2. The bottom of the Y 6 was also two inches long. This first jet was met at a point two inches below the end of the Y by a second jet from a 4 inch long tube having the same bore diameter. This second jet was an $NH_3$:$CO_2$ solution containing 0.0475 gram of $NH_3$ per ml. and 0.972 gram of $CO_2$ per ml. The flow rates were such that 100 ml. per minute of the 25% standard silicate solution was mixed with 25.6 ml. per minute of the 28% ammonia solution and this mixture was fixed with 37 ml. per minute of the ammonium carbonate solution. Thus the final mixture in receptacle 5 contained 4.6% $SiO_2$, 4.9% $NH_3$ and 2.1% $CO_2$ with 106 parts of ammonia to 100 parts of $SiO_2$ and 148 parts of $CO_2$ to 100 parts of $Na_2O$. The product from the mixing of the jets dropped into a beaker where it was agitated continuously and when analyzed had an average particle size of 39 m$\mu$. In general, this mixing after the solution has set causes an increase in particle size. The product was washed thoroughly on a Buchner funnel and dried for 18 hours at 105° C. The ignited loss was then about 4% and there was less than 0.1% gel as in the case of another example prepared in the same manner except that the mixing system was similar to that of FIG. 6 and used two jets. The product was dried at 105° C. for 24 hours and had an ignited loss of only 4% and a pH of 8 with a particle size of 29 m$\mu$. The jets in this latter case had a pore diameter of 0.055 centimeters while no additional mixing was undertaken after the formation of the precipitate.

Silica products obtained by using the same three above mentioned solutions, but using the prior art slow addition technique of first pouring the clustering agent into a mixing vessel containing the silicate solution and then adding the insolubilizing agent slowly, are definitely inferior to the product obtained by the jet mixing technique of this example. We have found that the products obtained by the prior art mixing always contain substantial amounts of silica gel which may range from 8 to 35% or more by weight. The particles by prior art methods also vary widely in size.

In contrast the products obtained by our new mixing techniques contain less than 0.2% gel and usually less than 0.1% gel as determined by the 325 mesh wet screen test. The particles are substantially uniform in size and the average particle size is smaller. In addition, the prior products retain about 10% of water after drying for 18 hours at 105° C. whereas the present products retain only about 4% of water under the same drying conditions. The prior products after thorough washing had a pH of from about 9 to 10 whereas the present products gave a pH of about 8 with much less washing. The present products also produce much better results when used as reinforcing agents in rubber compounding.

Example 2

In this example the jet mixing method was compared with our rapid-pouring method, the two products being compared as to their reinforcing actions upon rubber. In the hand pouring method an aged 25% standard silicate solution was again used. A 28% $NH_3$ solution was mixed with the silicate solution in a proportion such that there were 196 parts of $NH_3$ to each 100 parts of $SiO_2$. This was mixed thoroughly, giving a slight opalescence. Immediately thereafter a 20° Bé solution of HCl was poured in rapidly in an amount equivalent to 72 parts of HCl per 100 parts of $SiO_2$ (232 parts HCl per 100 parts $Na_2O$) and pouring was completed in about 2 seconds. Mixing was continued until the mixture thickened and then the solids were allowed to settle.

The final solution contained 4.4% $SiO_2$, 8.5% of $NH_3$ and 3.1% of HCl. The temperature was 25° C. and vigorous mixing was maintained throughout.

After settling, the supernatant liquid was decanted and ammonia was boiled out of the product layer. It was then filtered on a press and washed with water until free of chlorides and then dried at 84° C. for 88 hours in a tray drier.

An electron-micrograph indicated that the product was quite agglomerated and that the particle size was about 55 m$\mu$. The product also contained about 1% of gel so that the P and G particle size indicated was somewhat larger, being about 82 m$\mu$. Ignited loss was 9.4% and the pH was 8.9. The free water content was about 1.7% and linseed oil adsorption was 2.1 grams per gram. Titratable $Na_2O$ was 0.52% and the HF residue was about 1.5%. The hardness by the zinc abrasion test was 0.018 gm. $Zn/gm.SiO_2$/minute.

In a similar test in which the proportion of the sodium silicate to insolubilizing agent was maintained constant and the ammonia was about 75% of that required to produce opalescence, the reactants were mixed within one second and the violent agitation was completed within less than five seconds. The product was dried at 150° C. in a tray for three days and had an ignited loss of 5.8, a bulk density of 15.3 and an analysis of electron-micrographs showed that most of the particles were between 21 and 32 m$\mu$ in diameter.

In the jet mixing part of this test a technique was employed similar to that illustrated in FIG. 1 of the drawings. 25% standard silicate solution was used at a flow rate of 100 ml. per minute and mixed with a 28% $NH_3$ solution at a rate supplying 61 parts of $NH_3$ per 100 parts of $SiO_2$. The jet of insolubilizing agent was a solution containing about 10% $CO_2$ and 5.4% $NH_3$ (0.0474 gram of $NH_3$ per ml. and 0.0925 gram of $CO_2$ per ml.) The three jets each had a bore of 0.055 centimeter. The mixed stream from the jets was allowed to fall into a pail without further disturbance.

The final mixture had a composition of 3.6% $SiO_2$, 4.1% $NH_3$ and 3.6% $CO_2$. The reaction was carried out at 25° C. The ratio of $NH_3$ to $SiO_2$ was 115 parts of $NH_3$ per 100 parts of $SiO_2$ and 322 parts of $CO_2$ per 100 parts of $Na_2O$.

The product was filtered and washed free of $CO_2$ using distilled water. It was then dried at 110° C. for 18 hours. The layer was about one-quarter of an inch thick.

The silica product had a particle size of 28 millimicrons with an ignited loss of 5.3%, a pH of 7.9 and less than 0.1% gel.

Each of the two products were incorporated in the standard rubber formula using 30 parts of litharge as the accelerator in place of Santocure.

The following results were obtained:

| Description | Jet-mixed prod. | Hand-mixed prod. |
| --- | --- | --- |
| Optimum curing time in minutes | 7.5 | 15 |
| Load, p.s.i.: | | |
| 300% elongation | 1,900 | 350 |
| Break | 3,245 | 2,650 |
| Elongation, percent: | | |
| Break | 470 | 700 |
| Permanent | 28 | 31 |
| Tear resistance, lbs./inch thickness | 490 | 190 |
| Hardness—Shore A | 64 | 45 |
| Rebound, percent | 62 | 59 |

Both of these products are substantially better than any product which could be produced by a mixing technique involving the slow prior art addition of insolubilizing agent to the mixture of silicate and clustering agent.

The jet-mixed product was found to absorb accelerators of the Santocure type but the addition of a small amount of ethylene glycol overcame this difficulty to a large extent.

*Example 3*

A system similar to FIG. 2 was used with approximately the same composition and the product was dried at 185° C. for 24 hours. It had an ignited loss of 5.1 and a free water content of from 2 to 3%. Other portions of this sample were dried at 50° C. for 96 hours with an ignited loss of 8.1%, at 295° C. for 24 hours with an ignited loss of 4%, and another portion dried at 500° C. for 17 hours had a loss of 2.4%. The portion dried at 295° C. had the best rubber reinforcing properties. The product of this test had a particle size of about 24 m$\mu$ and a pH of about 8.

*Example 4*

A mixture was made containing 300 parts by weight of natural latex (33% solids) and 1980 parts by weight of a 25% standard silicate solution. To this mixture was added 972 parts of a 28% $NH_3$ solution containing 1 part by weight of piperidinium-N-pentamethylenedithiocarbamate, as accelerating agent, and 1 part by weight of phenylbetanaphthylamine, as anti-oxidant and in which 1 part of stearic acid had been emulsified. This produced incipient clustering. To this was added by jet mixing a mixture containing 17 parts of zinc chloride and 340 parts by weight of 36% HCl solution as insolubilizing agent. The silicate mixture and the insolubilizing agent were mixed very rapidly with jets in an arrangement similar to that shown in FIGURE 4 of the drawings. The crumb thus produced was filtered off and dried. If desired, fully compounded rubber obtained in this way can be milled before vulcanization depending upon the use to which it is put.

Similar procedures can be used in compounding rubber suitable for use as tire treads and carcasses, rubber heels, etc., as will be understood by those skilled in the art. This example also demonstrates the possibility of coprecipitating our fine silica with other solids. In most cases, the silica is so fine that it coats the other solids. In rubber latex, the diameter of the rubber globules is probably 30 or more times that of the silica particles.

*Example 5*

In this example a mixing system was employed similar to that shown in FIGURE 7 using Y tubes with diameters of 15 mm. Tube 17 was 5 feet of Tygon tubing with a diameter of 0.5 inch and tube 18 was 20 feet of Tygon tubing one inch in diameter. A 10% standard silicate solution was passed through at a rate of 11,500 ml. per minute. 9330 ml. of ammonium carbonate solution containing 0.2070 gram of $NH_3$ per ml. and 0.0395 gram of $CO_2$ per ml. were mixed with 516 ml. of 28% ammonia and this combination was mixed with the silicate solution through the other leg of the Y. The reaction was carried out at 38° C. and resulted in a final mixture of 1.5% $SiO_2$, 9.1% $NH_3$ and 1.63% $CO_2$. There were 610 parts of ammonia to 100 parts of silica and 350 parts of $CO_2$ to 100 parts of $Na_2O$. The precipitate was washed on a Buchner filter using distilled water and then dried overnight in a tray at 110° C. in a York drier. The final product had a particle size of 17 m$\mu$ and contained 0.02% of gel.

*Example 6*

A series of tests were run at 25° C. in which the final solution varied in ratio by weight of $NH_3$ to $CO_2$ of from 2.1 to 0.5. In one, the $SiO_2$ concentration was 2.4%, $NH_3$ was 7.3% and $CO_2$ was 2.3%, the ratios were 300 parts of $CO_2$ to 100 parts of $Na_2O$ and 300 parts of $NH_3$ to 100 parts of $SiO_2$. In this test in which 87 ml. of 28% $NH_3$ solution and 76 ml. 11° Bé. $NH_3:CO_2$ (0.0698 g. $NH_3$ and 0.1105 g. $CO_2$/ml.) solution were first mixed and then poured by hand into a container simultaneously with 200 ml. of a 15% standard silicate solution being mixed with a 4-bladed paddle at 600 r.p.m., a particle size of 16 mu was obtained but where the 28% $NH_3$ solution was first added to the said silicate solution and then similarly mixed by hand with 11° Bé. $NH_3$:$CO_2$ solution, the particle size was 32 mu. When only 250 parts of $NH_3$ per 100 parts of $SiO_2$ were used in this technique the particle size was 19 mu. A wholly similar series of tests with 400 parts of $CO_2$ to 100 parts of $Na_2O$ and 200 parts $NH_3$ to 100 parts of $SiO_2$, resulted in almost identical particle sizes of 16–17 mu but when the test was made at 9° C. the particle size was doubled. Less $NH_3$ would have produced the proper size range.

These products also were filtered on a Buchner filter, washed with nine volumes of distilled water and dried in the oven at about 110° C., pulverized in a hand mill and had a gel content of about 0.01–0.15%.

Example 7

The apparatus used for preparing this product was similar to the arrangement shown in drawing #7. 6750 ml. of $NH_3$:$CO_2$ solution (0.146 gram $NH_3$:0.078 gram $CO_2$ per ml.) was mixed with 116 ml. of 28% ammonia solution in a T and then was led into reaction with 11500 ml. of 10% standard sodium silicate solution in a glass Y. The silicate inlet to the Y was 15 mm. I.D., while the carbonate inlet was 10 mm. I.D. The outlet was 15 mm. I.D., the temperature was 32° C. This gave a final mixture containing 1.7% $SiO_2$, 5.2% $NH_3$ and 2.7% $CO_2$ with 300 parts of $NH_3$ per 100 parts of $SiO_2$ and 500 parts of $CO_2$ per 100 parts of $Na_2O$. The Reynolds number of the mixing procedure was 15000 with 12 feet of one inch tube leading from the final Y. The product was washed on a vacuum box washer with distilled water, reslurried, boiled, refiltered, dried at 110° C. in a tray-drier in lumps not greater than one inch in diameter. It was then ball-milled by equipment constructed of 1.25 inch pipe as described on page 1145 of Perry's Chemical Engineer's Handbook, 3rd Edition, McGraw-Hill Co., N.Y. 1950.

The product had a particle size of 16 mu with 11.3% ignited loss, a pH of 7.9, 0.71% $Na_2O$ and 1.1% HF residue. The linseed oil adsorption was 1.3 grams per gram of $SiO_2$ and there was 0.01% gel.

One portion of this product was coated with vinyltrichlorosilane by passing air through the silane at 10 to 15 liters per minute. The silane was heated to a vapor pressure of 300 mm. The air containing the silane was then passed concurrently with the silica through a glass tube until the silica was completely coated as shown by the development of water repellency. After this treatment the following properties were established:

Particle size _____ mu__ 19
Ignited loss _____ percent__ 8.8
Coating _____ do____ 15.2

When tested in the standard natural rubber formulation with optimum Santocure and 6% stearic acid, these data were obtained:

|  | Uncoated silica | Coated silica |
| --- | --- | --- |
| Percent Santocure | 3 | 1.0 |
| Modulus 300%, p.s.i | 970 | 1,600 |
| Tensile strength, p.s.i | 3,999 | 4,100 |
| Tear resistance, p.i | 705 | 850 |
| Hardness | 57 | 62 |
| Percent rebound | 52 | 56 |
| Abrasion, cc./H.P./hr | 250 | 118 |

Using approximately the same concentration of material and system of mixing, the pressure drop was 70 lbs. per sq. in. and the slurry was boiled before washing to remove ammonia, and then was well washed with distilled water on a Buchner vacuum funnel. The product was dried with an infra-red lamp giving a temperature in the cake of a little under 100° C. initially and up to 150° C. finally. This product was quite similar to that obtained in the first part of this example, but when coated with vinyl trichlorosilane and tested in rubber it had the following properties:

|  | Uncoated $SiO_2$ | Coated $SiO_2$ |
| --- | --- | --- |
| 300% elongation | 1,180 | 1,470 |
| Tensile strength, p.s.i | 3,330 | 4,040 |
| Tear resistance, p.i | 630 | 695 |
| Shore hardness | 61 | 60.5 |
| Rebound, percent | 52 | 46 |
| Abrasion loss, cc./H.P./hr | 300 | 90 |

The uncoated formulation required 3% Santocure while the coated combination required only 1% Santocure.

These values are within the ranges produced by rubbers reinforced by the high-grade carbon blacks used in the rubber industry.

Another similar test was run at a flow rate of 40,000 ml. developing a Reynolds number of 100,000. Fifty feet of half-inch plastic tubing was connected to the exit of the Y and the product was boiled at about atmospheric pressure for an hour to remove ammonia before washing. By varying the ratio of $NH_3$ to $SiO_2$ in the final mixture, particle sizes below 20 mu could be obtained over the range of about 251 to 290 parts of $NH_3$ per 100 parts of $SiO_2$.

One such product has a particle size of 18 mu, an ignited loss of 10.8%, an area of 134 m.$^2$/gr., a bulk density of 5.1 pounds per cubic foot and a linseed oil adsorption of 1.45 grams per gram, a pH of 7.7, 0.3% titratable $Na_2O$ and 1.3% HF residue. There was no gel residue.

The sample was compounded in the standard formula with 2.5% Santocure, and 1% Thermoflex A as antioxidant. Upon testing the following results were obtained:

Optimum cure, minutes _____ 25
300% elongation, p.s.i. _____ 840
Tensile strength, p.s.i. _____ 4050
Tear resistance, p.i. _____ 675
Hardness _____ 48
Percent rebound _____ 47
Abrasion loss, cc./H.P./hr. _____ 231

Another similar example was carried out with the arrangement shown in FIG. 5 at a flow rate of about 2,000 cc. per minute of 10% standard silicate solution. The product was washed and the filter cake was reslurried with 3 volumes of distilled water and heated by passing live steam into the slurry so that it boiled for one hour. The product, dried with the York tray drier, was passed through an Abbe mill and ball-milled.

The final silica had the following properties:

Particle size _____ mu__ 20
Bulk density _____ lbs./cu. ft__ 17.1
HF residue _____ percent__ 1.05
pH _____ 7.7
Percent $Na_2O$ (titratable) _____ 0.22
Wet sieve residue _____ percent__ 0.03
Ignited loss _____ do____ 6.53

The dried product was micronized as described in Example 7. The material which had a bulk density of 17.1 prior to reductionizing had a bulk density of 5.4 pounds per cubic foot afterwards. The particle size was unchanged and the wet sieve residue changed from 0.03% to 0.00%. Thermal conductivity was determined later on other samples.

|  | Ign. loss | Bulk density | K×10$^4$ at T cal./sec.-cm. | |
| --- | --- | --- | --- | --- |
| Dried sample | 4.1 | 12.1 | 1.01 (197° C.) | 0.79 (87° C.) |
| Undried sample | 10.4 | 13.8 | 1.19 (200° C.) | 0.85 (100° C.) |

A part of the undried slurry was spray dried in a 14' diameter conventional single fluid atomizing spray drier sold by Swenson Evaporator Company, Harvey, Illinois. This product resembled micronized silica in that it was flaky and slightly translucent. It appeared to be very uniform and settled slowly in water. The properties were as follows:

| | |
|---|---|
| pH | 7.9 |
| Particle size mu | 14 |
| Wet sieve residue percent | 0.01 |
| Bulk density lbs./cu. ft. | 12.7 |
| Percent $Na_2O$ (titratable) | 0.60 |
| Ignited loss percent | 10.1 |
| HF residue do | 2.02 |

The tray dried material was evaluated in a standard natural rubber formulation. At 3.25 parts of Santocure the composition vulcanized satisfactorily in 20 minutes. The following properties were found:

| | |
|---|---|
| Load at 300% elongation, p.s.i. | 1410 |
| Load 500% elongation, p.s.i. | 2890 |
| Load at break, p.s.i. | 3620 |
| Elongation at break, percent | 600 |
| Tear resistance, p.i. | 630 |
| Shore hardness | 50 |
| Impact resilience—percent rebound | 51.5 |

The material which was spray-dried was tested in the same formulation at 3.25% Santocure with the following results after curing 20 minutes:

| | |
|---|---|
| Load at 300% elongation, p.s.i. | 1620 |
| Load at 500% elongation, p.s.i. | 3120 |
| Load at break, p.s.i. | 3800 |
| Elongation at break, percent | 600 |
| Tear resistance, p.i. | 540 |
| Shore hardness | 56 |
| Impact resilience—percent rebound | 49.5 |

*Example 8*

A sample of finely divided silica produced as described in Example 7 was coated with zinc by reslurrying the wet filter cake at a concentration of 1000 parts of silica in 30,000 parts of a solution of zinc acetate and zinc chloride sufficient to provide 5% of Zn based on the dry silica content, i.e., 147 parts of zinc acetate, 33 parts of Zn metal dissolved in HCl. The product was filtered, dried 20 hours at 110° C. in an oven and milled. It was found that the sample had a zinc content of 5% by weight, and it had a particle size of 17 mu, a pH of 6.3, bulk density of 17.7 lbs./cu. ft., an ignited loss of 9.08%, titratable $Na_2O$ of 0.27%, HF residue 2.02% and wet sieve residue of 0.01%.

In another test the filter cake of silica from the low modulus sample described in Example 7 was dried and reductionized and this, as a base material, was slurried with a benzene solution of zinc stearate using enough zinc stearate to provide 20 parts per 100 parts of silica. After thorough mixing and standing overnight the slurry was filtered and then was dried 20 hours at 110° C. in an oven and thoroughly milled without washing. This product had a particle size of 22 mu, a bulk density of 16.5 lbs./cu. ft., an ignited loss of 20.9%, titratable $Na_2O$ of 1.64% and an HF residue of 4.9%. Since the sample was not wet by water, it was not possible to determine either the pH or the wet sieve residue but a Soxhlet extraction indicated that a coating of 2.5% was obtained.

In the case of the sample coated with 5% of Zn, absorption of Santocure was reduced from 0.013 grs./gr. of uncoated powder to 0.009 grs./gr. of coated powder. Dispersion in rubber was much improved by the coating.

Both samples were tested in the standard rubber formulation using 3.5% and 2.5% of Santocure respectively as accelerator:

| | Uncoated | Zn coated | Uncoated | Zn stearate coated |
|---|---|---|---|---|
| Tensile strength, p.s.i. | 3,500 | 3,500 | 3,920 | 3,490 |
| Modulus 300%, p.s.i. | 1,500 | 1,320 | 1,000 | 1,110 |
| Tear, p.i. | 715 | 600 | 610 | 695 |

Another similar test found that our fine silica product could be coated with aluminum using salts such as the chloride and nitrate, with magnesium using soluble magnesium salt, with tin using tin chloride, with lead and with all other metals forming insoluble silicates. A tin coating was found to increase the tensile strength, modulus and tear resistance of vulcanized rubber compounded therewith.

*Example 9*

In an arrangement similar to FIGURE 1, three jets were used with flow rates based on 100 ml. per minute of 25% standard silicate solution (11 Bé.) or 7.7 grams of $SiO_2$ per minute. The jet of silicate converged with that of a 28% $NH_3$ solution before meeting a jet of 9.9° Bé. technical ammonium carbonate solution containing 0.0475 gram of $NH_3$ and 0.097 gram of $CO_2$ per ml. The silicate and carbonate jets had bores of 0.102 centimeter and the diameter of the bore of the ammonia jet was 0.069 centimeter. The final solution contained 2.3% of $SiO_2$, 2.4% of $NH_3$ and 2.8% of $CO_2$ giving a ratio of 104 parts of $NH_3$ to 100 parts of $SiO_2$ and 384 parts of $CO_2$ to 100 parts of $Na_2O$. The reaction was carried out at 25° C. and the standard sodium silicate solution had been aged for several days. After the mixed solution set up from the jets it was not further agitated. It was filtered on a Buchner-type filter and washed with distilled water until free of $CO_2$ as shown by the fact that the filtrate did not effervesce when made acid. The product was then dried at 110° for 20 hours.

The relative flow rates per minute were 100 ml. of the 25% standard sodium silicate solution, 14 ml. of the 28% $NH_3$ solution and 95 ml. of the $NH_3$:$CO_2$ mixture. The particle size was 19 mu.

The tests in the following four specific examples were conducted using a hand-pouring technique wherein the silicate solution was introduced into a beaker and this solution was stirred while the clustering and insolubilizing agents were added. In all cases the insolubilizing agent was added immediately after the clustering agent and thoroughly mixed within a period of less than 5 seconds. In the third example the clustering agent and insolubilizing agent were mixed before this mixture was added to the silicate solution.

*Example 10*

This test was made using 100 grams (85 ml.) of a solution containing 7.74% $Na_2O$ and 7.53% $SiO_2$ (i.e. 1.0 $Na_2O$:1.0 $SiO_2$). Here the equilibrium opalescence ratio was 0.73 (62 ml. of 28% $NH_3$ solution to 85 ml. of the metasilicate solution). 16 ml. of $NH_4OH$ (i.e. 98% of the opalescence ratio) was added to this solution of incipient clusters followed by 40.4 ml. concentrated HCl (0.0414 gram of HCl per ml.). In this example 216 parts of HCl per 100 parts $Na_2O$ and 203 parts of $NH_3$ per 100 parts of $SiO_2$ were used. This is 1.83 acid equivalents compared to one equivalent of $Na_2O$. The original solutions were at 25° C. and the addition of the ammonia reduced the temperature of the mixture to 20° C. The temperature increased to 55° C. on the addition of the HCl.

The final solution contained 3.7% $SiO_2$, 7.5% $NH_3$ and 8.2% of HCl. The product was washed well with distilled water and dried in the oven at 100° C. It had a particle size of 37 mu and 0.01% wet sieve residue.

Example 11

The equilibrium opalescence ratio was found to be 0.71 for a 25% standard silicate solution and a 28% $NH_3$ solution. In this test at 25° C., 100 ml. (108 grams) of 25% standard silicate solution was mixed with 106.5 ml. of the 28% $NH_3$ solution. Thus, the percent of opalescence ratio employed was 150. The solution of incipient clusters was insolubilized by the addition of 9 ml. of concentrated $H_2SO_4$ diluted 1:1 with water. This example had 3.3% of $SiO_2$, 12.3% of $NH_3$ and 3.5% of $H_2SO_4$ in the final solution. Thus, 370 parts of $NH_3$ per 100 parts of $SiO_2$ and 340 parts of $H_2SO_4$ per 100 parts of $Na_2O$ were used. This was equivalent to 2.03 acid equivalents to one equivalent of $Na_2O$. The precipitate was washed well with distilled water on the Buchner filter and dried in the oven at 100° C. The product had a particle size of 43 mu and no wet sieve residue.

Example 12

"RU" silicate ($Na_2O$:2.4 $SiO_2$) was diluted to 16.6% $SiO_2$ and 128 ml. was mixed with 567 ml. of a solution of ammonia and $CO_2$ (13 $NH_3$, 9.5% $CO_2$) equivalent to 545 parts of $CO_2$ per 100 parts $Na_2O$ (7.35 acid equivalents) and 310 parts of $NH_3$ per 100 parts $SiO_2$. The equilibrium opalescence ratio was found to be 0.52. The final solution had 3.3% $SiO_2$, 10.4% of $NH_3$ and 7.6% of $CO_2$. The test was carried out at 40° C. initial temperature and the product had a size of 41 mu with no wet sieve residue after thorough washing with distilled water and drying in an oven at 100° C. Since 16.6 gr. $NH_3$ as $NH_4OH$ caused the appearance of opalescence in 128 ml. of this diluted "RU," the 80 grs. present in the $NH_3$:$CO_2$ solution represents 485% of the opalescence ratio. This is possible because of the greater dilution when $NH_3$ and $CO_2$ are added as one solution.

Example 13

100 ml. of "S" silicate ($Na_2O$:3.9 $SiO_2$) diluted to 7.5% $SiO_2$ was mixed with 50.5 ml. of 28% $NH_3$ solution. This mixture is 104% of the opalescence ratio which is 0.49. Then 16 ml. of concentrated HCl (2.96 times the $Na_2O$ equivalent) was added as the insolubilizing agent. The final solution contained 4.3% of $SiO_2$, 7.2% of $NH_3$ and 3.8% of HCl with 168 parts of $NH_3$ per 100 parts of $SiO_2$ and 345 parts of $CO_2$ per 100 parts of $Na_2O$. The temperature changed from the original 25° C. to 20° C. on the addition of ammonia and rose again to 38° C. by adding the acid. The product had a particle size of 27 mu and no wet sieve residue after thorough washing and drying in an oven at 100° C.

Example 14

Two processes involving a double precipitation were tested. In the first, 600 ml. of 28% ammonia solution were added rapidly with vigorous stirring to 300 ml. of a 30% standard sodium silicate solution. The resultant slurry was filtered and insolubilized with 120 ml. of a solution of 50% by weight sulfuric acid just before the cake cracked on the filter. The cake was then washed with 600 ml. of water and the secondary precipitate which formed in the wash water was filtered and washed further with water.

A similar reaction was carried out, but 135 ml. of concentrated HCl stoichiometrically equivalent to the $H_2SO_4$ was used as the insolubilizing agent. In both these cases the silicate solution was partially clustered and the large particles of clustered sodium silicate solution were filtered off and fixed on the filter. The acid which washed through the filter served to fix the remaining silica present in the wash water as a solution of incipient clusters of sodium silicate. This product had a smaller particle size and a much reduced wet sieve residue as shown as in the following table:

|  | $H_2SO_4$ | HCl |
|---|---|---|
| Parts acid per 100 parts $Na_2O$ | 735 | 507 |
| Parts $NH_3$ per 100 parts $SiO_2$ | 412 | 412 |
| First precipitate: |  |  |
| Size, mu | 110 | 106 |
| Wet sieve residue, percent | 2.0 | 0.28 |
| Second precipitate: |  |  |
| Size, mu | 70 | 70 |
| Wet sieve residue, percent | 0.01 | 0.01 |

A second process of partial precipitation was carried out. A solution of incipient clusters of sodium silicate was partially insolubilized in steps by the addition of acid and each precipitated portion of insoluble silica was filtered off and washed and tested.

In this example the temperature remained at 25° C. 400 ml. of a 25% standard silicate solution was agitated in a liter beaker and 240 ml. of a 28% ammonia solution was added rapidly. Immediately afterwards varying amounts as shown in the table below of concentrated HCl (1.183 s.g., 36% HCl) were added. The precipitate was stirred for one minute, filtered and washed with three liters of tap water. Precipitates were then dried at 110° C. for 20 hours. The amount of $NH_3$ corresponded to 193 parts by weight per 100 parts of $SiO_2$. The average ignited loss of a dried product was 8.7%.

The following table shows the product size, the wet sieve residue, and the percent recovery of $SiO_2$ for each volume of acid insolubilizing agent.

| Total mls. conc. HCl | Parts HCl by weight/ 100 pts. $Na_2O$ | Product size, mu | Product wet sieve residue, percent | Product recovery gms. | Percent* recovery |
|---|---|---|---|---|---|
| 4 | 18 | 37 | 5.10 | 1.2 | 3.9 |
| 8 | 35 | 63 | 6.90 | 8.3 | 26.8 |
| 12 | 53 | 48 | 0.77 | 19.0 | 61.3 |
| 16 | 71 | 55 | 1.70 | 23.4 | 75.5 |
| 20 | 89 | 51 | 0.49 | 25.3 | 81.7 |
| 24 | 106 | 51 | 0.19 | 27.0 | 87.2 |
| 28 | 124 | 47 | 0.04 | 27.5 | 88.8 |
| 32 | 141 | 46 | 0.05 | 27.2 | 87.7 |
| 36 | 159 | 54 | 0.05 | 27.5 | 88.8 |
| 40 | 177 | 51 | 0.00 | 27.8 | 89.7 |
| 80 | 354 | 34 | 0.00 | 29.4 | 94.9 |
| 240 | 1,061 | 46 | 0.00 | 30.2 | 97.5 |

* Based on the theoretical maximum yield of 31 grams.

The data in the above table show what happens when an insolubilizing agent is added slowly to a mixture of silicate solution and clustering agent. It is shown that the initial precipitate produced contains a substantial amount of gel. After the addition of about 10% of the total acid required to precipitate all of the silicate, the percentage of gel formed drops off rather abruptly to a value of about 0.05% but it is not until about 15% is added that no further gel is formed. It is evident therefore that any method wherein an insolubilizing agent is added slowly to a solution of incipient clusters of sodium silicate will produce an end product which is contaminated with silica gel. It is also shown that this contamination with gel can be avoided if from about 10 to 15% of the total acid required to precipitate the silica is first added and the resulting precipitate is removed from the solution before the addition of the remaining acid.

In further tests, 240 mls. of 28% ammonia solution (equivalent to 193 parts of $NH_3$/100 parts $SiO_2$) were added to 400 mls. of 10% standard silicate solution at 25° C. undergoing agitation. Within a few seconds, varying portions of concentrated HCl were added. The precipitate was filtered and to the filtrate was added more concentrated HCl to make a total of 80 mls. Each precipitate was well washed, dried and tested. The results:

|  | Mls. conc. HCl | Pts. HCl/100 pts. Na₂O | Product size, mu | Product wet sieve residue, percent | Product percent recovery |
|---|---|---|---|---|---|
| From table above | 80 | 354 | 34 | 0.00 | 94.9 |
| Original precipitate | 16 | 71 | 56 | 11.4 | 68.7 |
| Filtrate precipitate | 64 | 283 | 41 | 0.00 | 17.9 |
|  |  |  |  |  | 86.6 |
| Original precipitate | 8 | 35 | 50 | 12.1 | 24.6 |
| First filtrate precipitate | 8 | 35 | 43 | 0.8 | 44.6 |
| Second filtrate precipitate | 64 | 283 | 42 | 0.00 | 14.1 |
|  |  |  |  |  | 83.3 |

This procedure, of adding insolubilizing agent in two steps with an intermediate filtrating step, is not as practical as our preferred method of thoroughly mixing in the insolubilizing agent within a period not substantially exceeding about 5 seconds and before the appearance of any substantial amount of an irreversible precipitate. But if a gel-contaminated product can be used for any purpose, it is possible to obtain one in this manner in addition to a gel-free product. Incidentally the values for the particle size given in the first six lines of the second table of this example as well as in the second, fourth, and fifth lines of the above table are doubtless in error due to the contamination with silica gel. These values were determined by the method of Pechukas and Gage which method is known to give low results for products contaminated by gel. The above examples show that particularly good results are obtained in our process when $NH_3$ and $CO_2$ are used either in admixture or separately as clustering agent and insolubilizing agent. When these materials are used the ratio of $NH_3$ to $CO_2$ in parts by weight should be within the range of from about 0.5:1 to 4.3:1 for best results. From about 2 to 4 parts by weight of $NH_3$ to 1 part of $SiO_2$ should be used while the $CO_2$ should be supplied at the rate of about 6 to 2 parts by weight per part of $Na_2O$. For the higher silicate ratios, from about 4 to 6 parts of $CO_2$ should be used per part of $Na_2O$. If the quantity of ammonia used is close to the lower end of its operative range a larger quantity of $CO_2$ is required and vice versa. But too much ammonia will cause clustering and hence too large particles, while too little ammonia will result in the formation of a gel upon the addition of insolubilizing agent. When $CO_2$ is used as insolubilizing agent in combination $NH_3$, a smaller quantity of the latter is required than in the case of faster acting (stronger acid) insolubilizing agents. As an example, when $CO_2$ is used as an insolubilizing agent, it requires only about 110 parts of $NH_3$ to 100 parts $SiO_2$ whereas this requirement is increased to about 150 parts if HCl is used as insolubilizing agent. This may be due to the fact that the $CO_2$ causes insolubilization to proceed at such a slow speed that the $NH_3$ has more time to produce the required incipient clustering.

*Example 15*

A filtered 20% standard silicate solution containing 0.0637 gram of $SiO_2$ and 0.0199±.0001 gram of $Na_2O$/ml. at a specific gravity of 1.07 (9.5° Bé.) was stored for a minimum of 24 hours at about 27° C.

A combined clustering and insolubilizing solution of $NH_3$ and $CO_2$ was prepared by absorbing $CO_2$ in 28% ammonium hydroxide and diluting to a final concentration of 0.100 gram of $NH_3$/ml. and 0.12 gram of $CO_2$/ml. at a specific gravity of 1.05 (6.9° Bé.). During the further processing, the stripping of ammonium-carbonate solution from the precipitated silica will be described. This stripped solution may be used as a base solution and additional concentrated $CO_2$ and $NH_3$ added to bring the concentration to the above figures.

Both the 20% standard silicate solution and the combined clustering agent solution were heated to 28.5±.5° C. just prior to mixing in an arrangement similar to that shown in FIGURE 7. 939 gallons of this silicate solution per minute and 498 gallons per minute of the $NH_3$:$CO_2$ solution were mixed in a Y made of one inch stainless steel pipe connected to about 3.5 feet of one and one-quarter inch I.D. Tygon tubing followed by two feet of two inch I.D. Tygon tubing used as an expansion nozzle to cut down the velocity of flow from the tubing. Opalescence occurred in the expansion nozzle just after the point of connection with the smaller tubing. The final solution contained 3.93% $SiO_2$, 3.26% $NH_3$ and 3.92% $CO_2$ with 83 parts of $NH_3$ per 100 parts of $SiO_2$ and 321 parts of $CO_2$ per 100 parts of $Na_2O$. The precipitated mix was allowed to fall gently onto a column of slurry, the volume of which was large enough so that any part of the mix was retained in the column for 5 minutes before it reached the bottom of the column from which it was pumped to the stripping column. The Reynolds number for the flow in the smaller tubing was calculated to be about 67,000.

The precipitated silica composition was passed through a heat exchanger to exchange with the stripper bottoms. Thus, the precipitated silica composition was heated to about 70° C. at which temperature it entered the top of the stripping column where almost all of the ammonia and $CO_2$ were removed during a period of about 10 to 20 minutes. At the bottom of the column, concentrated sulfuric acid (96% $H_2SO_4$, specific gravity 1.84) was added until the stripped slurry had a pH of 8. This required approximately 16 gallons per hour of concentrated acid corresponding to the typical flows mentioned above. The stripper bottoms were passed through the heat exchanger to the first filter. The stripping was accomplished by the addition of live steam and the condensation of this steam diluted the precipitate to approximately .036 grams of precipitated $SiO_2$/ml. of slurry. During most of the time in the stripping column the slurry was at approximately the boiling point. The stripper bottoms after exchange came off at a temperature of about 60° C. To these bottoms was added approximately 0.2% by weight of $SiO_2$ of Aeromine 3037 sold by American Cyanamid Company as a filter aid or promoter. It is an alkaline, fatty, organic nitrogen material and may be substituted for by cetyl trimethyl ammonium bromide.

The treated slurry was fed to a rotary filter where it was washed with cold water. The discharged filter cake passed to a mixing tank where it was diluted again with cold water to about .5% $SiO_2$ whereas the filter cake contained about 12% $SiO_2$. This reslurried filter cake was passed directly into a second rotary filter without further treatment and was again washed with cold water. The filter cake from the second filtration contained approximately 15% solids. This cake was reslurried to about 10% silica. In each washing step approximately 1 volume of cold water was used per volume of filter cake.

The final reslurry containing 10% precipitated $SiO_2$ was passed into a commercial-type spray drier under conditions such that the product contained volatile components equal to approximately 6% ignited loss after drying. The inlet temperature was 600° F. and the outlet was 300° F. The material remained in the spray drier for less than a minute. The silica from the main collection system of the drier and that from the bag collectors was combined and, in a general case, this product was fed into a commerical Reductionizer manufactured by the Reduction Engineering Corporation. In such a device the agglomerates were reduced by circulating the material rapidly around a dough-nut shaped tube using compressed cold air at about 100 p.s.i. From the Reductionizer the material went to a small cyclone separator and then to storage.

This product could be densified by passing through a device in which the air was removed by evacuation at about 8 p.s.i. absolute and the powder compressed at about 5 p.s.i. The bulk density is thus increased substantially and the dustiness decreased.

Where the product is to be used in grease, an additive such as glycerine may be sprayed or dripped in fine streams on the combined product from the spray drier before reductionizing. This final product will contain about 1.4% bound water and 7.7% of glycerine or about 4 gallons per hour of commercial glycerine at 98% concentration. The product may then be reductionized and densified as before.

The products of these processes have the following properties:

|  | Without additive | With additive |
| --- | --- | --- |
| Particle size, mu | 15 | 16 |
| Bulk density, lbs./cu. ft. | 2.8 | 3.5 |
| pH | 7.6 | 7.6 |
| Titratable alkali as Na₂O, percent | 0.25 | 0.23 |
| Residue on HF treatment, percent | 0.54 | 0.50 |
| Oil adsorption (linseed, g./100 g.) | 169 | |
| Grease penetration at 12% | 243 | 244 |
| Surface area, m.²/gr | 104 | |
| Ignited loss, percent | 9.4 | 15.0 |
| Loss at 105° C., percent | 5.2 | 7.1 |
| Wet screen residue, percent | 0.00 | 0.00 |
| Refractive index | 1.46 | |

These products were tested in hot GR-S rubber, milling on an open mill for approximately 50 minutes. The 27% by volume formula was:

| | Parts by weight |
| --- | --- |
| GR-S rubber | 100 |
| Zinc oxide | 5 |
| Sulfur | 3 |
| Agerite powder (phenyl betanaphthylamine) | 1.0 |
| Altax (dibenzothiazyldisulfide) | 1.2 |
| Methyl Tuad (tetramethylthiuram disulfide) | 0.15 |
| Picco 100 (cumarone-indene resin) | 3.5 |
| Diethylene glycol | 3.5 |
| Silica | 58.5 |

These were cured at 280° F. with an optimum curing time of 45 minutes. The uncoated material had a 300% modulus of 1220 p.s.i. and a tensile strength of 2820 p.s.i. Tear resistance was 250 p.i. With the coated material the optimum curing time was 30 minutes. The 300% modulus was 670 and the tensile strength was 2700. The tear resistance was 285.

A finely divided silica made from a solution having a similar composition but with a stream of NH₃:HCl rather than NH₃:CO₂ had a particle size of about 20 mu. The solution set up much more rapidly at 25° C. than did the carbonate mixture. Mixing was done in apparatus similar to FIG. 7 in which the tubes had a radius of 0.3 cm. The streams met in a plastic fanning-out device with an exit 1 cm. wide and 0.1 cm. high. We spread the solution on a belt moving at 16 ft. per minute.

Another product was formed with ammonium carbonate but using the apparatus of FIG. 6 at 200 ml. per minute. This was a hand-poured product and had considerably higher residual impurities. 2.6% Na₂O and 5.0% HF residue. The product was collected and washed in a 12 foot box-type filter using nine volumes of tap water per volume of cake. The product was then dried at 110° C. and air-separated with a Federal Pneumatic Air Separator sold by Federal Classifier Systems, Chicago. The drier was a tray-type drier and the lumps were not greater than one inch thick.

Part of the product was coated with 0.65% ethylenediamine by including 5% based on the weight of the silica in the jet of standard sodium silicate solution.

The product had the following properties:

|  | Uncoated silica | Coated silica |
| --- | --- | --- |
| Particle size, μ | 17 | 15 |
| Bulk density, lbs./cu. ft. | 15.9 | |
| Ignited loss, percent | 9.3 | 9.3 |
| Linseed oil adsorption, grs./gr. | 1.53 | |
| pH | 9.2 | 8 |
| Titratable Na₂O, percent | 2.6 | 1.4 |
| HF residue, percent | 5.0 | |

Both samples were tested by the standard rubber formulation using standard tests:

|  | Uncoated silica | Coated silica |
| --- | --- | --- |
| Santocure, percent | 2.25 | 3.25 |
| Time, minutes | 10 | 10 |
| Tensile, p.s.i. | 3605 | 3800 |
| Modulus 300%, p.s.i. | 1020 | 1070 |
| Tear, p.i. | 715 | 670 |
| Hardness | 53 | 54 |
| Percent rebound | 46 | 42 |

It is evident that the coating was not very helpful. However, in a test using an Altax-Tuad accelerator system at 10 volume loading a tensile strength of 4100 p.s.i. was obtained.

Electron-micrographs of these two fillers show that some agglomerates in the range of 400 to 500 mu were present but that there were many fine particles in the range of about 20 mu. It is believed that the fine particles are responsible for the high tear values while the agglomerates tended to reduce the tensile strength of the vulcanized rubber.

*Example 16*

In this example the mixing device was somewhat similar to that shown in FIG. 7. All the reactants were at the standard temperature of 30.5±0.5° C. A 20% standard silicate solution containing 0.0189 grams of Na₂O and 0.0607 grams of SiO₂ per ml. was forced at the rate of 16,000 ml. per minute through one side of a half inch stainless steel Y and 12,000 ml. of an NH₃:CO₂ solution containing 0.0844 gram of NH₃ and 0.1000 gram of CO₂ per ml. were forced through the other side of the Y and then mixed in 13 feet of ⅜ inch I.D. reinforced Tygon tubing following by a one inch I.D. nozzle one foot long. The total pressure drop was 55 p.s.i. and the temperature of precipitation was 30.9±0.3° C. The turbulence of flow was indicated by a Reynolds number of 68,000. Opalescence appeared just at the end of the tubing. The final solution contained 3.3% of SiO₂, 3.46% of NH₃ of NH₃ and 4.1% of CO₂ with a ratio of 105 parts of NH₃ to 100 parts of SiO₂ and 400 parts of CO₂ to 100 parts of Na₂O.

The solution discharged onto a moving belt where it was held quiescent for 32 seconds and then discharged into a tank and thence into the suction end of an Eco pump. This is a standard positive displacement pump with 2 cylindrical eccentrically displaced impellers sold by Economy Faucet Company of Newark, New Jersey.

50 gallons of the slurry was pumped onto a 3 foot by 4 foot stainless steel vacuum box filter. The cake formed on the filter was washed with 80 to 90 gallons of 90° C. tap water to give a resultant pH of 7.8. The washed, dewatered cakes were reslurried with tap water to a solids content of 7 to 8% for spray-drying. The materials were then spray-dried at standard conditions including an extra period of drying for one hour by passing hot air at 300° F. through the bag-house after the feed had been terminated. The spray-drier was a Swenson research-type spray-drier with a feed pressure of 50±5 p.s.i., an inlet temperature of 750° F., an outlet temperature of 250° F. and with the atomizing air at 60±5 p.s.i.

The product had the following properties:

| | |
|---|---|
| Particle size, mu | 16 |
| Bulk density lbs./cu. ft. | 6.9 |
| Area m.²/gr. | 163 |
| Ignited loss, percent | 9.9 |
| Titratable $Na_2O$, percent | 0.56 |
| HF residue, percent | 2.24 |
| pH | 8.1 |
| Wet sieve residue | 0.00 |
| Refractive index | 1.46 |
| Linseed oil absorption g./g. | 1.78 |

This product was tested in natural rubber which when unloaded had an optimum cure time of 150 minutes, a load at break of 2150 p.s.i., a 300% modulus of 170 p.s.i. with a tear resistance of 65 p.i. With 20 volumes of our silica reinforcing filler the composition cured in 15 minutes at 280° F with the following results:

| | |
|---|---|
| 300% modulus p.s.i. | 1600 |
| 500% modulus p.s.i. | 3160 |
| Tensile strength p.s.i. | 3950 |
| Elongation at break percent | 620 |
| Tear resistance p.i. | 840 |
| Shore hardness | 64 |
| Rebound percent | 58.5 |

A GR–S rubber composition with 3.5 parts of Santocure accelerator was undercured but still had a tensile strength of 3060 p.s.i. and a modulus of 1060 p.s.i.

A similar solution was made up by passing the respective solutions into separate legs of a one-half inch stainless steel Y followed by 13 ft. of ⅜ inch I.D. Tygon tubing connected to one foot of one inch I.D. Tygon tubing. Opalescence occurred in this expansion nozzle.

The filter cake in the press was washed with 2 volumes of cold tap water. The cake was discharged and reslurried with a further 2 volumes of cold tap water and acidified to a pH of 5.5 using sulfuric acid diluted 1 to 3 with water. This was refiltered on the Shriver filter press, again reslurried and the pH raised to 8.2. This slurry was then fed to a spray drier with an inlet temperature of about 1100° F., an outlet temperature of 315° F. and an atomization pressure of 55 p.s.i. After drying, the product was reductionized and has the properties given in the following table:

| | |
|---|---|
| Particle size, mu | 13 |
| Bulk density, lbs./cu. ft. | 3.2 |
| pH | 8.0 |
| $SiO_2$ (anhydrous basis) percent | 99.5 |
| Loss at 105° C. wt. percent | 4.5 |
| Ignited loss, wt. percent | 9.6 |
| Area m.²/gr. | 279 |
| Titratable $Na_2O$, wt. percent | 0.25 |
| HF residue, wt. percent | 0.73 |
| Wet sieve residue, wt. percent | 0.00 |
| ASTM linseed oil absorption, lbs./100 lbs. | 202 |
| Grease thickening power, mm./10 strokes | 241 |

The product could be densified by passing through an evacuation system at about 8 p.s.i. absolute and the powder compressed at about 5 p.s.i. Where the product is to be used in grease, glycerine may be added by spraying or dripping fine streams on the product before reductionizing.

By using suitable modifications of this process as indicated in the previous examples, the products have the properties indicated below:

| | Without additive | With additive |
|---|---|---|
| Particle size, mu | 10–20 | 11–18. |
| Bulk density, lbs./cu. ft. | 10–12 | 10–12. |
| pH | 4.5–10 | 8–10. |
| $SiO_2$ content, percent (anhydrous basis). | Greater than 95. | Less than 91.3. |
| Free water, percent | 2–10 | 2–6. |
| Bound water, moles of $SiO_2$/moles of $H_2O$. | 4–8 | Greater than 12. |
| Filler form | Porous flocs | Porous flocs. |
| Surface area, m.²/gr. | 90–300 | 90–300. |
| $Na_2O$ content, percent | 0.1–1.5 | 0.5–1.5. |
| Tensile strength in natural rubber, p.s.i. | Greater than 3700. | Greater than 3500. |
| Tensile strength in GR–S rubber, p.s.i. | Greater than 2500. | Greater than 2500. |
| Modulus in natural rubber, p.s.i. | Greater than 1300. | |
| ASTM linseed oil absorption in lbs./100 lbs. | Greater than 180. | Greater than 160. |
| 325 M wet sieve residue, percent | 0.00 | 0.00. |
| Grease thickening power, mm./10. | Less than 245 | Less than 245. |
| HF residue | Less than 4% | Less than 4%. |
| Ignited loss, percent | 5–15 | 10–20. |
| Refractive index | 1.46 | |

In another example, using a similar composition, we exemplify the commercial potential of the finely divided silica formed by our invention. The following example shows the method of preparation of a high area-low pH silica. Silicas having areas ranging from 25 m.²/gram up to about 400 m.²/gram without the formation of gel particles may be prepared. At the same time the pH may be varied from below 4.5 to above 9.0.

The difficult problem of separation of the silica from a highly ammoniacal mother liquor is overcome by diluting the original slurry with cold tap water thus reducing the original concentration of the salts during initial filtration. Thus the cake as it was formed contained much less impurities and localized shrinking did not take place. As a further aid to filtration, it was found that between 1 and 2½ volumes of wash water were required for the first wash on the filter. The mixing system of FIG. 7 was employed. After washing and filtering, the filter cake was reslurried to a 10% slurry and stored in polyethylene lined drums until it was spray dried using an inlet temperature of 1160° F., 305° F. outlet temperature, and an air pressure of 55±5 p.s.i. The slurry pressure was 58±5 p.s.i.

This product had a particle size of 10 mu and an ignited loss of 11.2%. The pH was 6.3. The bulk density was 11.9 pounds per cubic foot but when reductionized it had a bulk density of about 2 pounds per cubic foot. The area was 390 m.²/gr. The linseed oil adsorption was 219 pounds per 100 pounds product and the grease thickening power was 253 mm./10. There was no sieve residue. The HF residue was about 0.35 and the $Na_2O$ titratable content was 0.06%. Free water was about 6%.

*Example 17*

800 ml. of aged 10% standard silicate solution containing 0.010 grams of $Na_2O$ per ml. and 0.0322 grams of $SiO_2$ per ml. was placed in a cylindrical plastic vessel 18 inches long by 5 inches in diameter with 3 pairs of baffles alternated at 90° angles, each baffle being about 1 inch high, 1½ inches long and ¼ inch thick. They were set at levels approximately one inch apart. The impeller was a ½ inch stainless steel rod with 2 blades curved and located between each pair of baffles on the bottom of the vessel. This rotated at a speed of 3450 r.p.m. The temperature of the reactants was 32° C.

A volume of 342 ml. of $NH_3:CO_2$ solution containing 0.0938 grams of $CO_2$ per ml. and 0.1202 grams of $NH_3$ per ml. and 254 ml. of 28% $NH_3$ ammonia solution were added to the vessel with a stirrer in operation in such proportion that there was 400 parts of $CO_2$ per 100 parts of $Na_2O$ and 410 parts of ammonia per 100 parts of $SiO_2$. The final concentration of $SiO_2$ was 1.8%, 7.4% $NH_3$ and 2.2% $CO_2$. After reaction the precipitate was filtered and washed with 9 volumes of distilled wash water. It was reslurried and boiled for 60 minutes. After filtering, a layer of the product less than ⅛ inch thick was dried under an infra-red lamp which developed a maximum temperature of 150° C. in the product. It was then milled and reductionized. The product characteristics were as follows:

| | |
|---|---|
| Particle size, mu | 19 |
| Bulk density, lbs./cu. ft. | 4.3 |
| Ignited loss percent | 10.38 |
| Wet sieve residue percent | 0.00 |
| pH | 8.0 |
| Titratable $Na_2O$ percent | 0.73 |
| HF residue percent | 2.05 |

This material was tested in the standard formulation with Santocure at 3.5 parts by weight. The composition cured in 15 minutes at 287° F. The following results were obtained:

| | |
|---|---|
| 300% modulus p.s.i. | 1715 |
| 500% modulus p.s.i. | 3130 |
| Load at break p.s.i. | 3870 |
| Elongation at break percent | 595 |
| Tear resistance p.i. | 685 |
| Shore hardness | 54 |
| Rebound percent | 63 |

In a somewhat similar series of tests, sodium carbonate was added as an additional clustering agent equivalent to 50% of the free $Na_2O$ in the sodium silicate. The product was filtered on a Buchner type filter, washed ten times with distilled water, and dried over-night with an infra-red lamp at a maximum final temperature of about 150° C.

The table shows that gel was formed when too little clustering agent is present. By the addition of sodium carbonate the effective concentration of the clustering agent was increased and less gel was formed.

| Parts NH | No $Na_2CO_3$ | | $Na_2CO_3$ | |
|---|---|---|---|---|
| | Size, mu | Wet sieve, percent | Size, mu | Wet sieve, percent |
| 500 | 33 | 0.00 | 30 | 0.00 |
| 475 | 29 | 0.00 | 26 | 0.00 |
| 450 | 19 | 0.00 | 20 | 0.00 |
| 425 | 13 | 0.01 | 17 | 0.02 |
| 400 | gel | 28.0 | gel | 2.9 |

*Example 18*

Using a one-half inch diameter stainless steel Y followed by 24 feet of ⅜ inch I.D. heavy-walled Tygon tubing, somewhat similar to the arrangement shown in FIG. 7, a solution of 10% standard silicate solution and $NH_3:CO_2$ was mixed and the slurry discharged through a one foot long piece of one inch Tygon tubing onto a belt moving at 30 feet per minute. The sodium silicate containing 0.01014 grams of $Na_2O$ per cc. and 0.0328 grams of $SiO_2$ per cc. was used at a rate of 25,000 parts by volume per minute. 12,900 parts by volume of $NH_3:CO_2$ solution containing 0.1260 grams of ammonia per cc. and 0.0933 grams of $CO_2$ per cc. was mixed with 1280 parts by volume of 28% $NH_3$ solution just prior to mixing with the silicate solution in the Y. The final mixture contained 2.0% of $SiO_2$, 4.9% $NH_3$ and 3.0% $CO_2$. The mix proportions were about 250 parts of $NH_3$ per 100 parts of $SiO_2$ and 500 parts of $CO_2$ per 100 parts of $Na_2O$. The temperature was about 32.2±.5° C. with a total pressure drop of 63 p.s.i.

The slurry was boiled for one hour, filtered within 4 hours and washed with tap water and then spray-dried in the Swenson research apparatus. The slurry had a Baumé gravity of 7.5 when sprayed into the drier. The inlet temperature was 680–720° F. and the outlet temperature was 290±30° F. The feed pressure was 40 to 50 p.s.i. and the atomizing air pressure was 50 p.s.i.

Additional drying at about 350° F. was maintained for 3 hours.

This material had the following properties:

| | |
|---|---|
| Particle size, mu | 18 |
| Bulk density, lbs./cu. ft. | 7.1 |
| Titratable alkali as $Na_2O$ percent: | |
| (cold) | 0.58 |
| (hot) | 0.75 |
| Actual $Na_2O$ percent | 0.34 |
| Ignition loss percent | 11.3 |
| pH | 7.9 |
| Surface area m.²/gr. | 103 |
| Wet sieve residue percent | 0.00 |
| CaO percent | 0.55 |
| MgO percent | 0.21 |
| $Al_2O_3$ percent | 0.24 |
| $Fe_2O_3$ percent | 0.76 |

In a similar solution using the equipment of FIG. 5 the product was prepared at an opalescence ratio of 23%. This product was boiled 1 hour before washing, instead of boiling the slurry. It was dried in a tray drier instead of being spray dried.

The product was ball-milled and reductionized and had a particle size of 20 mu with a bulk density of 4.1 p.c.f. The ignited loss was 10.5%, the pH was 7.8 and titratable $Na_2O$ 0.48%. HF residue was 1.02%. There was no gel.

The product was tested in the standard rubber formulation using 3% of Santocure. The optimum curing time was 20 minutes and provided a tensile strength of 3700 p.s.i., a 300% modulus of 1600 p.s.i., a tear of 520 p.i., a hardness of 51 and a rebound of 61%.

Before boiling the particle size was 17 mu and after boiling, 18 mu. The product was white, soft and had a tendency to form pellets. The slurry did not set up on the belt itself.

In a formulation cured 25 minutes with 2.5 parts of Santocure accelerator the following properties were obtained:

| | |
|---|---|
| Load at elongation (300%) p.s.i. | 1400 |
| Load at 500% elongation p.s.i. | 2840 |
| Load at break p.s.i. | 4020 |
| Elongation at break percent | 652 |
| Tear resistance p.i. | 650 |
| Shore hardness | 56 |
| Rebound percent | 69 |

*Example 19*

In this example 9000 ml. per minute of a commercial, undiluted clarified "E" sodium silicate containing .1203 grams of $Na_2O$ and .3872 grams of $SiO_2$ per ml. were caused to react with 19,700 ml. per minute of an $NH_3:CO_2$ solution containing .0688 grams of $NH_3$ and .1040 grams of $CO_2$ per ml. by causing the two liquids to flow into the arms of a one-half inch stainless steel Y followed by two feet of one inch I.D. Tygon tubing. The mixed solution contained 10.5% $SiO_2$, 4% of $NH_3$ and 6.1% of $CO_2$ corresponding to 39 parts of $NH_3$ per 100 parts of $SiO_2$ and 190 parts of $CO_2$ per 100 parts of $Na_2O$. Precipitation of the silica occurred in the tubing and the set-up mixture issued from the end of the tubing in the form of one inch diameter cylinders approximately 3″ to 5″ long. These cylinders remained on a moving belt with some syneresis for about 30 seconds and were then collected from the end of the belt in a container. The reaction occurred at 32.3° C. with a total pressure drop of 46 p.s.i.

The lumps of precipitate were reslurried with tap water to about 4% solids and filtered on a vacuum-type box filter. The dewatered cakes were then washed with an excess of 70° C. tap water and the washed cakes after dewatering were reslurried with tap water to about 8% solids and spray-dried with an air inlet temperature of 1100° F., an air outlet temperature of 295° F. and an atomization pressure of 45 p.s.i. The slurry feed pressure was 52 p.s.i.

The product had the following properties:

| | |
|---|---|
| Particle size, mu | 14 |
| Ignited loss percent | 9.1 |
| Bulk density, lbs./cu. ft. | 7.2 |
| pH | 8.0 |
| Titratable $Na_2O$ percent | 0.69 |
| HF residue percent | 1.75 |
| Wet sieve residue percent | 0.00 |
| Surface area m.$^2$/gr. | 143 |
| Linseed oil adsorption grs./gr. | 2.18 |
| Grease penetration value | 346 |

When tested in natural rubber using the standard formulation at a Santocure value of 3.5% the optimum cure time was 15 minutes. The 300% modulus was 1140 p.s.i., the tensile strength was 3650 p.s.i. and the tear resistance was 675 p.i.

*Example 20*

In this example 16,000 parts by volume of a 20% standard silicate solution which was aged overnight and contained 0.0637 grams of $SiO_2$ and 0.0198 grams of $Na_2O$ per ml. were caused to react with 12,120 parts by volume of $NH_3:CO_2$ solution containing 0.0840 grams of $NH_3$ and 0.1041 grams of $CO_2$ per ml. by passing the respective solutions into the separate legs of a one-half inch stainless steel Y followed by 13 feet of ⅜ inch I.D. Tygon tubing connected to one foot of one inch I.D. Tygon tubing. Opalescence occurred in this expansion nozzle. The final solution contained 3.4% of $SiO_2$, 3.3% of $NH_3$ and 4.1% of $CO_2$ thus having 100 parts of $NH_3$ per 100 parts of $SiO_2$ and 400 parts of $CO_2$ per 100 parts of $Na_2O$. The reaction temperature was 30.5° and the pressure was 44 p.s.i.

From the expansion nozzle the precipitated mixture passed onto a moving belt, said belt moving at a speed of 30 feet per minute, from whence it passed to a collection system for further processing. It was thus quiescent for at least 30 seconds.

The precipitated product was diluted with 2 volumes of cold tap water, thoroughly mixed and then filtered in a Shriver filter press containing 18 frames, each 24" x 24". The filter cake in the press was then washed with 2 volumes of cold tap water and the cake was discharged and reslurried with a further 2 volumes of cold tap water and acidified to a pH of 5.5 using sulfuric acid diluted 1 to 3 with water. The acidified slurry at a pH of 4.6 was refiltered through the Shriver press and again washed with 2 volumes of cold water. The filter cake was discharged from the press, reslurried, diluted to 6% solids and caustic soda added to raise the pH to 8.2. This slurry was fed into the spray drier using an inlet temperature of about 1100° F., an outlet temperature of 315° F. and an atomization pressure of 55 p.s.i. The feed pressure was 60 p.s.i. After drying the product was reductionized and had the properties given in the following table.

| | |
|---|---|
| Particle size, mu | 13 |
| Bulk density, lbs./cu. ft. | 3.2 |
| pH | 8.0 |
| $SiO_2$ (anhydrous basis) percent | 99.5 |
| Loss at 105° C. wt. percent | 4.5 |
| Ignited loss, wt. percent | 9.6 |
| Area m.$^2$/gr. | 279 |
| Titratable $Na_2O$, wt. percent | 0.25 |
| HF residue, wt. percent | 0.73 |
| Wet sieve residue, wt. percent | 0.00 |
| ASTM linseed oil absorption, lbs./100 lbs. | 202 |
| Grease thickening power, mm./10 strokes | 241 |

The product could be densified by passing through an evacuation system at about 8 p.s.i. absolute and the powder compressed at about 5 p.s.i. Where the product is to be used in grease glycerine may be added by spraying or dripping fine streams on the product before reductionizing.

By using suitable modifications of this process as indicated in the previous examples, the products have the properties indicated below.

| | Without additive | With additive |
|---|---|---|
| Particle size, $\mu$ | 10–20 | 11–18. |
| Bulk density, lbs/cu. ft. | 10–12 | 10–12. |
| pH | 4.5–10 | 8–10. |
| $SiO_2$ content, percent (anhydrous basis) | Greater than 95 | Less than 91.3. |
| Free water, percent | 2–10 | 2–6. |
| Bound water, moles of $SiO_2$/moles of $H_2O$ | 4–8 | Greater than 12. |
| Filler form | Porous flocs | Porous flocs. |
| Surface area, m.$_2$/gr | 90–300 | 90–300. |
| $Na_2O$ content, percent | 0.1–1.5 | 0.5–1.5. |
| Tensile strength in natural rubber, p.s.i. | Greater than 3700 | Greater than 3500. |
| Tensile strength in GR-S rubber, p.s.i. | Greater than 2500 | Greater than 2500. |
| Modulus in natural rubber, p.s.i. | Greater than 1300 | |
| ASTM linseed oil absorption in lbs/100 lbs. | Greater than 180 | Greater than 160. |
| 325 M wet sieve residue, percent | 0.00 | 0.00. |
| Grease thickening power, mm./10 | Less than 245 | Less than 245. |
| HF residue | Less than 4% | Less than 4%. |
| Ignited loss, percent | 5–25 | 10–20. |
| Refractive index | 1.46 | |

*Example 21*

Exemplifying the commercial potential of the finely divided silica formed by our invention, the following example shows the method of preparation of a high-area-low pH silica. We are thus able to prepare silicas having areas ranging from 25 m.$^2$/gr. up to about 400 m.$^2$/gr. without the formation of gel particles as shown by our gel screen test. At the same time the pH may be varied from below about 4.5 to above about 9.0.

The most difficult problem in the preparation of a high area silica by our process is the separation of the silica from its highly ammoniacal mother liquor in its original precipitated form without substantial loss of surface area. This means that the original slurry of precipitated silica should not be heated. Our experience has shown that the stumbling block to this separation and washing of the product is the inability to form cakes in the filter press, which, on washing, do not crack badly, thus making the displacement with water ineffectual and resulting in a prohibitive loss of ammonia. With the proposed product, this ammonia loss is compounded since the subsequent step is a neutralization of the fixed alkali giving a low pH. This would require the neutralization of the remaining ammonia on the filter cake before the alkali would be neutralized. It would not only require a large additional amount of acid but also intensify the final washing problem which requires the removal of any excess acid, sodium sulfate and ammonium sulfate which make up the impurities.

We were able to overcome these difficulties by diluting the original slurry with cold tap water, thus, reducing the original concentration of the salts during initial filtration. Thus, the cake, as it is formed, contains much less impurities and localized shrinking does not take place. As a further air to filtration, it was found that between 1 and 2.5 volumes of wash water were required for the first wash on the filter.

At 29° C. 17,000 parts by volume of 20% "E" sodium silicate solution at 0.0198 g. $Na_2O$ and 0.0638 g. $SiO_2$ per ml. was used with 12,250 parts by volume of $NH_3:CO_2$ solution containing 0.0997 g. $NH_3$ and 0.0878 g. $CO_2$ per ml. of solution.

The final composition contained 3.5% $SiO_3$, 3.9% $NH_3$ and 3.4% $CO_2$ with a ratio of 112 parts $NH_3$ to 100 $SiO_2$ and 320 parts $CO_2$ to 100 parts $Na_2O$. The pressure drop was 45 p.s.i. through the system and opalescence occurred in the nozzle. The standard mixing device similar to FIG. 7 was used with ½ inch I.D. stainless steel Y, 13 feet of ⅜ inch I.D. reinforced Tygon tubing and 6 feet of one inch Tygon (unreinforced) nozzle. Instead of a belt, a retention column of 31 inches above the suction of the Eco pump was used. This gave a retention time of 2 minutes.

From the retention chamber, the product was pumped into a mixing chamber where 135 gallons was made up to 405 gallons with tap water. It was filtered at a maximum pressure of 35 p.s.i. and was washed in the Shriver filter press at a rate of 2.5 gallons per minute of tap water and a maximum pressure of 50 p.s.i. A total of 120 gallons of wash water was used corresponding to 135 gallons of original precipitated slurry. The filter cake had a solids content of 15.8%.

This was reslurried to a solids content of 0.02 grs./ml. and concentrated sulfuric acid diluted 1 part to 3 parts water was added to neutralize the $Na_2O$. Thus, 70 gallons of cake with 270 gallons of water was neutralized with 2 liters of diluted sulfuric acid at 20° C. The final pH was 5.5 and the temperature remained about as above. This slurry was then filtered at a maximum pressure of 40 p.s.i. and washed at a pressure of 50 p.s.i. maximum using 100 gallons of wash water. The cake retained 0.1% $SO_3$.

The filter cake was reslurried to a 10% slurry and stored in polyethylene-lined drums until it was spray dried using an inlet temperature of 1160° F., 305° F. outlet temperature and an air pressure of 55±5 p.s.i. The slurry pressure was 58±5 p.s.i.

This product had a particle size of 10 mu and an ignited loss of 11.2%. The pH was 6.3. The bulk density was 11.9 pounds per cubic foot but when reductionized it had a bulk density of about 2 pounds per cubic foot. The area was 390 m.²/gr. The linseed oil adsorption was 219 pounds per 100 pounds product and the grease thickening power was 253 mm./10. There was no sieve residue. The HF residue was about 0.35 and the $Na_2O$ titratable content was 0.66%. Free water was about 6%.

Example 22

In this example carbon dioxide gas was used to insolubilize a mixture of 24% standard silicate solution, 1523 parts, and 524 parts of 28% $NH_3$ solution. This corresponds to a solution of 5.2% $SiO_2$ and 7.2% $NH_3$. The ratio was 138 parts $NH_3$ to 100 parts $SiO_2$. A sealed stainless steel vessel with an agitator containing 2000 volumes of the above solution was used as an absorber with a mixture of air containing 10% $CO_2$ simulating a flue gas bubbled in the bottom at an initial flow rate of 1334 volumes per minute. This quickly raised the internal pressure to 10 cm. of water. The internal pressure from then on varied between 10 and 15 cm. increasing as the reaction continued over a period of about one hour.

Nearly complete precipitation of the silica was obtained at an absorption of about 2% $CO_2$, or 125 parts of $CO_2$ to 100 parts $Na_2O$. The initial room temperature was 24.5% C., the final batch temperature was about 40.5% C. The product was filtered on a Buchner-type filter and washed with distilled water. After drying in a tray drier at about 100° C., the product contained about 10% water and had an ultimate particle size of over 100 mu.

An example using a similar solution was prepared by hand methods and hydrochloric acid. The reaction mixture was boiled at constant volume until nearly all the ammonia was removed. As shown in the following table, the boiling step reduced the surface area. If, however, the mixture was boiled under reduced pressure at 35° C. to remove ammonia, the surface area was 80 m.²/gram.

The properties of this material were:

Particle size, mu _____ 47
pH _____ 6.6
Ignited loss, percent _____ 11.8
Bound water, percent _____ 3.7
Wet sieve residue, percent _____ 0.0
Titratable $Na_2O$, percent _____ 0.24
Bulk density, lbs./cu. ft _____ 46.7
Surface area m.²/gr. _____ 22

Example 23

In this example sodium chloride was used as the clustering agent. Enough salt to develop incipient clustering was necessary. It was found convenient to add the salt as a saturated solution with an excess 10% of salt crystals. These salt crystals dissolved when added to the diluted silicate solution and in a few minutes a faint opalescence was observed.

Thus, 35 ml. of a sodium chloride solution containing 39.6 grams of NaCl and 100 grams of water was mixed with 50 ml. of a 35% standard silicate solution and allowed to come to equilibrium with agitation at room temperature. Then 4 ml. of 50% sulfuric acid was added with vigorous agitation. The final solution contained 5.0% $SiO_2$, 12.7% NaCl and 2.5% $H_2SO_4$. The ratios were 254 parts NaCl to 100 parts of $SiO_2$ and 127 parts $SO_3$ to 100 parts $Na_2O$.

The resultant product was filtered off on a Buchner funnel, washed well with distilled water and dried at about 105° C., in an oven. The particle size was about 30 mu and the ignited loss was about 5% $H_2O$.

Example 24

In this example 61 ml. of 25% standard silicate solution was brought to incipient clustering by the addition of 13 ml. of methyl alcohol at room temperature and in a beaker with a bubble rise of 10.5 cm. and 11.1 cm.² area. Carbon dioxide was then bubbled into the vigorously agitated solution at a rate of about 400 cc. per minute for 5 minutes. The final solution contained 6.1% $SiO_2$, 13.2% methyl alcohol and about 2% of $CO_2$. The ratios were 216 parts of alcohol to 100 parts $SiO_2$ and 100 parts $CO_2$ to 100 parts $Na_2O$. The product after filtering on a Buchner filter, washing thoroughly with distilled water and drying at about 105° C. in an oven, contained about 5% $H_2O$ and had a particle size of over 100 mu.

Example 25

A series of tests of abrasion resistance were made on the products of Examples 16, 18 and 7 to confirm that high modulus and high tear resistance correlate with good abrasion resistance. Examples were cured 25 minutes. The results are tabulated below:

| Filler | Channel black (W-0) | Ex. 16 | Ex. 18 | Ex. 7 (coated) | Ex. 7 | Ex. 7 with anti-oxidant | Best commercial inorganic filler with anti-oxidant |
|---|---|---|---|---|---|---|---|
| Percent Santocure | 0.75 | 0.75 | 2.5 | 1.0 | 2.5 | 2.5 | 1.25 |
| Optimum time | 25 | 30 | 25 | 35 | 25 | 25 | 20 |
| 300% modulus, p.s.i. | 1,015 | 530 | 1,120 | 1,445 | 875 | 840 | 570 |
| Tensile, p.s.i. | 4,820 | 3,130 | 3,770 | 4,050 | 3,750 | 4,050 | 3,840 |
| Elongation, percent | 655 | 660 | 615 | 590 | 650 | 655 | 680 |
| Tear, p.i. | 645 | 545 | 615 | 740 | 580 | 675 | 460 |
| Abrasion loss | 124 | 497 | 196 | 119 | 231 | 234 | 328 |
| Hardness | 51 | 42.7 | 48.7 | 57 | 46.6 | 47.2 | 44.6 |

Example 26

When 30 parts by volume of 28% $NH_3$ solution was mixed with 50 parts by volume of 25% standard silicate solution at room temperature in the presence of 3 parts by weight of fine cotton fibers, the silica was in a state of incipient clustering. This silica was then insolubilized by the addition of 7 parts by volume of concentrated hydrochloric acid. The solution contained 4.3% $SiO_2$, 8.5% $NH_3$, 3.2% HCl or a ratio of 200 parts $NH_3$ to 100 parts $SiO_2$ and 270 parts HCl to 100 parts $Na_2O$. The dried product recovered consisted of cotton fibers, 3 to 5 microns wide and 50 to 200 microns long, coated evenly with finely divided silica. The particle size of this silica was difficult to determine but it appeared to be less than 100 millimicrons in diameter. The reaction was carried out at room temperature and the product was dried at about 100° C. in an oven after filtering and washing on a Buchner filter. Similar products were formed when asbestos fibers, paper fibers, or nylon fibers were substituted for cotton. Other fibrous materials can be used where it is desired to obtain the increased resistance to slippage and other advantages of such surface treatment.

Example 27

Resinous or plastic materials which can be dissolved, emulsified or otherwise dispersed in aqueous solution can be loaded or filled with silica in the same way as the synthetic rubber latex which is well known to be a dispersion of polymerized resin. Example 5 shows this reaction with rubber latex. We found that 50 parts by volume of a concentrated sodium rosinate solution was completely miscible with 50 parts by volume of 30% standard silicate solution. Incipient clustering was obtained by adding 20 parts by volume of methyl alcohol, about 11.3% of the solution, and the solid silica, about 3.4% in the final mixture, was then insolubilized by the addition of 15 parts by volume of concentrated hydrochloric acid. This, brought down the rosin at the same time in a finely divided form. On drying this finely divided intimate mixture is coalesced into an apparently homogeneous lump of resin loaded with silica. Polyvinyl alcohol and lignin resins can be loaded in a similar manner.

This represents a much more satisfactory method of forming intimate mixtures of resin and filler than previous milling procedures.

Example 28

Sixty-four parts of a solution containing 25% of a standard silicate solution was mixed with 114 parts of "experimental latex X-275 (formulation RO-99) 45% solids" (from the Dow Chemical Company) to form a homogeneous sol. A protocoacervate was formed by the addition of 35 parts by volume of 28% $NH_3$ solution. This was insolubilized by adding as a unit 10 parts by volume of 50% $H_2SO_4$ solution while agitating the coacervate vigorously. The clear final solution became opaque within 5 seconds. When washed with distilled water and dried at about 105° C. in an oven a hard rubbery "crumb" was obtained containing 75% rubber and 25% $SiO_2$. These proportions may be varied with ease over a wide range. When examined with a microscope the mixture appeared to be homogeneous.

We have found that lattices in general (natural and synthetic) can be treated in the same general manner to produce intimate mixtures of rubber and $SiO_2$. This is a very convenient and economical method of impregnating rubber with a filler of $SiO_2$.

Example 29

A rubber crumb was prepared loaded with 10% $SiO_2$ by adding 20 parts by volume of 25% standard silicate solution to 50 parts of the GR-S latex (Type 3, 38.12% solids, from Naugatuck Chemical Company). This mixture was converted to a protocoacervate by adding 15 parts of 28% $NH_3$ solution and the solids insolubilized by the addition of 5 parts of concentrated HCl added as a unit while agitating vigorously. A translucent solution was formed which became opaque within 5 seconds. In this case also finely divided $SiO_2$ was intimately mixed with the rubber fibers.

Similarly a crumb was prepared with 90% $SiO_2$ by mixing 220 parts by volume of a standard silicate solution and 150 parts of 28% $NH_3$ solution with 5 parts of the same GR-S latex and insolubilizing with 25 parts of concentrated HCl as before.

From these examples it is evident that any desired loading can be obtained by this procedure.

Other coacervating agents such as brine or alcohol have also been used successfully. For instance 50 parts by volume of 30% standard silicate solution, 15 parts of $CH_3OH$ and 50 parts of the same GR-S latex were mixed and 10 parts of concentrated HCl were added in the same way as an insolubilizing agent. The product was similar to that obtained when NaCl and $NH_4OH$ were used as coacervating agents. It was an intimate mixture of rubber fibers and very finely divided silica.

Example 30

Many basic organic cations react with soluble silicates in a manner analagous to ammonium salts. Used in our process, a silica-extended basic organic cation product is obtained. Basic dyes such as methyl thionine chloride, the oxalate of Malachite Green or the chloride of Gentian violet form highly colored dyes absorbed in the finely divided silica. Quaternary ammonium compounds when so absorbed form germicidal or disinfectant products in an extended form which have special uses. For instance, when used in an insecticidal spray, the product remains sufficiently soluble to be effective but is not as easily washed away. Quternary ammonium salts are phenyl trimethyl ammonium chloride, tetraethanolammonium sulfate, guanidine carbonate, etc. and examples of other strong organic bases are the substituted amines having a pH at 25° C. in a 25% aqueous solution above about 11.2 e.g. diethanolamine, morpholine, cyclohexylamine, etc.

In one case a protocoacervate of 10 parts by volume of a 25% standard silicate solution was formed by adding 5 parts by volume of saturated sodium chloride solution. On the addition of 6.6 parts by weight of Malachite Green as the oxalate added as a unit with vigorous agitation a soft precipitate of silica having a deep green color was formed in less than five seconds. The product retained its color on drying at 85° C.

Similarly, 53 parts of 25% standard silicate solution was formed into a protocoacervate by the addition of 25 parts of 28% $NH_3$ solution and to this was added 0.78 part of Methylene Blue (methylthionine chloride) and finally 33 parts of concentrated HCl was added as a unit before any separation of the silica occurred. The product was soft, finely divided, and colored a deep blue. When dried at 85° C., the color remained.

When Crystal Violet as the chloride salt was used, the product was a deep purple. This product was washed until the wash water was a faint purple and then dried. The product remained a deep violet.

When $NH_4OH$ is used as the clustering agent with these basic dyes, a white or leuco base is temporarily dispersed in the solution until the acid restores the color to the solution.

ADDITION OF A HYDROPHILLIC COLLOID

We have discovered that it is frequently advantageous to have a hydrophillic colloid present in the reaction mixtures during the precipitation of the silica. This seems to have the effect of preventing agglomeration of the silica particles and increases the ease of milling the silica product into rubber for example. Good results have been obtained with starch, gelatine, gum arabic and rubber latex. The colloid can be added either to the clustering agent, to the insolubilizing agent or to the sodium silicate solution before the mixing operation. The colloid must, of course, be compatible with these solutions.

COATING THE FINELY DIVIDED SILICA

We have found it advantageous to coat our silica products with various agents which prevent absorption of the accelerator by the silica when our products are compounded with rubber. These agents also act as dispersing agents during milling with rubber and other materials. These agents include the metal, ammonium and substituted ammonium compounds of long chain fatty acids, such as sodium stearate, sodium resinate, aluminum stearate, ethylene diamine, allyl amine, vinyl amine, stearic acid and silane halides, such as ethyl chlorosilane, butyl chlorosilane, cyclo-hexyl chlorosilane, methyl chlorosilane, trimethyl silicon chloride, phenyl chlorosilane and unsaturated silanes, such as vinyl trichlorosilane, allyl trichlorosilane, butenyl trichlorosilane, cyclohexenyl trichlorosilane, vinyl and allyl alkyldichlorosilanes and siloxanes, such as ethyl vinyl silicate, and dialkenyl dichlorosilanes. Oleaginous materials produce much the same improvement, such as "Renex" (sold by Atlas Powder Company) rosin oil, tar acid, coconut oil, tall oil, turkey red oil, pine oil, etc. Of the various coating materials tested it was found that "Renex," and the unsaturated trichlorosilanes and siloxanes showed ability to increase the tensile strength, modulus and tear resistance of vulcanized rubber compounded therewith, resulting in better reinforcement.

SILICA IN COMBINATION WITH OTHER MATERIALS

In our previous applications it has been shown that fine silica can be precipitated from solution in the presence of all types of finely divided resinous, polymeric and collodial materials. Several examples are given wherein rubber latices are mixed with silicate solutions, followed by the addition of clustering agents and finally by the addition of insolubilizing agents, this procedure resulting in the formation of rubber crumbs uniformly impregnated with finely divided silica, the silica being deposited in and on the rubber fibers. Other natural and synthetic resins and polymeric materials can be loaded or filled with silica in the same manner, examples being sodium rosinate, polyvinyl, lignin resins, etc. Various fibrous materials such as cotton, asbestos fibers, paper, etc., can be impregnated with fine silica by mixing the finely divided material with an opalescent mixture of silicate and clustering agent followed by the addition of an insolubilizing agent, whereby the silica deposits in and on the fibers of the finely divided material to be impregnated. Our more recent tests indicate that our equilibrium mixing techniques are capable of producing the same types of impregnated materials with the advantage that the silica particles are much finer, more uniform and free from gel. In the case of liquids, such as rubber latices or emulsions of resins, these can be mixed with the silicate solution prior to jet mixing with the clustering agent and insolubilizing agent. In the case of solids to be impregnated it is only necessary to saturate the material to be impregnated with the jet-mixed silicate, clustering and insolubilizing agents before any substantial precipitation of the silica has taken place. It is only necessary that the finely divided material to be impregnated be present in the mixture during the precipitating step of our process.

POSSIBLE MODIFICATIONS

While we have described what we consider to be the more advantageous embodiments of our process, it is evident, of course, that various modifications can be made in the specific procedures which have been described without departing from the purview of this invention. It is believed to be obvious from the above description that any of the clustering (i.e. coacervating) agents which are known to be capable of clustering alkali metal silicate solutions can be used in our process and that any water soluble acidic material having an anion of an acid stronger than silicic acid and capable of precipitating silica or silica gel from solutions of alkali metal silicates and being free from cations forming insoluble silicates, in other words any acidic material which is capable of precipitating substantially pure silica from a mixture of silicate and clustering agent, can be used as insolubilizing agent. Using our new mixing technique it is not even necessary that the clustering agent be strictly compatible with the insolubilizing agent but only that any precipitate formed by mixing these two agents be more soluble than the precipitate formed upon mixing the silicate solution with the insolubilizing agent. As shown in Example 17 it is possible in our process to employ a mixture of clustering agents to produce the desired opalescent solution. It is also possible, of course, to employ a mixture of different insolubilizing agents in the precipitating step of our process. When mixtures of clustering agents or of insolubilizing agents are employed these agents should be compatible at least to the extent that no precipitate is formed upon mixing them which is less soluble than the finely divided silica product. The temperatures used in our process are not critical since any reasonable temperatures (e.g. 1–100° C.) can be employed with proper regulation of the other variables. However, we prefer the range of about 10° C. to 40° C. as being convenient and economical. The concentrations of silicate solution and clustering agent are critical for the formation of the finest particle sizes as described previously. Unfortunately it is impossible to set out specific ranges of concentrations which will apply to all silicate solutions, all clustering agents and all insolubilizing agents. But with the aid of the simple tests and specific examples which have been given it is believed that those skilled in the art will have no difficulties in adapting our process to any silicate solution, any coacervating agent and any insolubilizing agent which it is desired to employ in the process. It is possible, of course, to employ any of the soluble alkali metal silicates, such as potassium and caesium silicates, as a substitute for the sodium silicate solutions used in our process although this is more of academic than practical interest owing to the higher cost of the other alkali metal silicates.

Also, whereas it is desired that the final particle size range for the silica products of this invention be broadly between 7 and 100 millimicrons, it is recognized that in order to obtain reinforcement of rubber the particle size must be below 50 mu and preferably below 25 mu. In order to obtain the very best rubber reinforcing values including high modulus, it is desirable that the particle size be below 20 mu and preferably below 15 mu. Further modifications of our process which fall within the scope of the following claims will be immediately evident to those skilled in the art.

What is claimed is:

1. In the manufacture of finely-divided silica, the process which comprises mixing an aqueous solution of sodium silicate, having a weight ratio of $Na_2O$ to $SiO_2$ within the range of from about 1:2.4 to 1:4 and a concentration of $SiO_2$ ranging from about 1 to 30 percent by weight, with ammonia in an amount ranging from about 80 to 500% of the quantity required, when slowly added to the silicate solution, to produce the first appearance of coacervation in the mixture; the higher concentrations of $SiO_2$ being employed with the lower ratios of $Na_2O$ to $SiO_2$; mixing in as an insolubilizing agent $CO_2$ in amount sufficient substantially complete to precipitate the silicate; the quantity of $NH_3$ added varying from about 0.8 to 4 parts by weight to one part of $SiO_2$ in the silicate solution while the $CO_2$ is varied correspondingly from about 6 to 2 parts by weight to one part of $Na_2O$ in the silicate solution; conducting the mixing in such a manner that addition of the $CO_2$ is completed within a period not exceeding 5 seconds and so the $NH_3$ is completely mixed in not later than the $CO_2$; the concentrations of said solutions being so chosen that the total $SiO_2$ content in the final mixture is within the range of from about 0.5 to 8 percent by weight; and recovering the resulting finely-divided silica product substantially free from silica gel.

2. In a process for the manufacture of finely divided silica products wherein an aqueous solution of sodium silicate having a weight percent ratio of $Na_2O$ to $SiO_2$ within the range of from about 2:1 to 1:4 and a sodium silicate concentration of from about 0.5 to 30% $SiO_2$ is contacted with a coacervating agent capable of clustering aqueous sodium silicate solutions and an insolubilizing agent consisting of an acidic material having an anion of an acid stronger than silicic acid and capable of precipitating substantially pure silica from the mixture, the improvement which comprises:

(a) introducing said coacervating agent in a quantity within the range of 20-500% of the equilibrium opalescence ratio,
(b) introducing the insolubilizing agent in a quantity sufficient to pricipitate gel-free silica,
(c) maintaining the environmental conditions substantially uniform in the above mixture while the finely divided silica products are in formation by;
(d) mixing said coacervating agent with said sodium silicate solution not later than said insolubilizing agent is mixed therewith,
(e) completing the mixing in of the insolubilizing agent before the appearance of any substantial amount of a silica precipitate, and in any event within a period not substantially exceeding five seconds,
(f) following completion of the mixing in of the insolubilizing agent, recovering the finely divided silica thereby produced.

3. The process of claim 2 wherein aqueous solutions containing $NH_3$ are used as the coacervating agent.

4. The process of claim 2 wherein $CO_2$ is the insolubilizing agent.

5. The process of claim 2 wherein ammonium carbonate solutions are used to function in the dual capacity of a coacervating and insolubilizing agent.

6. The process of claim 2 wherein substantial amounts of particulate non-siliceous solid material upon which silica will deposit is incorporated in the solution so that the finely divided silica will precipitate and coat such solid material.

7. The process of claim 6 wherein rubber latex is present in the final mixture and the product recovered is a rubber crumb impregnated with finely divided hydrated $SiO_2$.

8. The process of claim 6 wherein said non-siliceous solid material is fibrous material.

9. Finely divided, precipitated silica pigment capable of producing vulcanized rubber products having a modulus of at least 1300 p.s.i. at 300% extension and a tensile strength above 3700 p.s.i. when incorporated in an amount of 42.6 parts with 100 parts of natural rubber, 5 parts ZnO, 3 parts sulphur, an optimum Santocure level between 0.75 and 4.5 parts and 3 parts of stearic acid and vulcanized at 287° F., said pigment having a particle size within the range of 10-20 mu, a pH within the range of 4.5-10, an $SiO_2$ content greater than 95% on an anhydrous basis, a 0.00% 325 mesh wet sieve residue, an HF residue less than 4% and an ignited loss of between about 5 and 15%.

References Cited by the Examiner

UNITED STATES PATENTS

| | | | |
|---|---|---|---|
| 741,592 | 10/03 | Roberts | 117—126 |
| 1,270,093 | 6/18 | Arsem et al. | 23—182 |
| 1,687,919 | 10/28 | Yabbick | 23—182 |
| 1,715,439 | 6/29 | VanNes | 23—182 |
| 1,819,356 | 8/31 | Church | 23—182 |
| 1,843,576 | 2/32 | McClure et al. | 23—182 |
| 2,114,123 | 4/38 | Heuser | 23—182 |
| 2,386,337 | 10/45 | Moyer | 23—182 |
| 2,399,687 | 5/46 | McNabb | 23—182 |
| 2,477,293 | 7/49 | Filachione et al. | 260—89.5 |
| 2,505,629 | 4/50 | Thomsen et al. | 117—124 |
| 2,573,057 | 10/51 | Porter | 23—182 |
| 2,649,388 | 8/53 | Willis et al. | 260—37 |
| 2,719,098 | 9/55 | Goldman | 117—124 |
| 2,806,012 | 9/57 | Allen | 260—41.5 |
| 2,819,151 | 1/58 | Flemmert | 23—182 |
| 2,859,198 | 11/58 | Sears et al. | 260—37 |
| 2,913,441 | 11/59 | Anspon et al. | 260—89.5 |
| 2,914,503 | 11/59 | Pechukas | 260—41.5 |
| 2,940,830 | 6/60 | Thornhill | 23—182 |
| 3,010,791 | 11/61 | Allen | 23—182 |

MAURICE A. BRINDISI, *Primary Examiner.*

GEORGE D. MITCHELL, ROGER L. CAMPBELL, *Examiners.*